United States Patent
Ishibashi et al.

(10) Patent No.: US 12,068,672 B2
(45) Date of Patent: Aug. 20, 2024

(54) CONTROL CIRCUIT FOR POWER CONVERTER APPARATUS PROVIDED WITH PFC CIRCUIT OPERATING IN CURRENT-CRITICAL MODE

(71) Applicant: OMRON Corporation, Kyoto (JP)

(72) Inventors: Hiroki Ishibashi, Kyoto (JP); Hiroyuki Onishi, Kyoto (JP); Shingo Nagaoka, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 241 days.

(21) Appl. No.: 17/629,259

(22) PCT Filed: Jul. 27, 2020

(86) PCT No.: PCT/JP2020/028679
§ 371 (c)(1),
(2) Date: Jan. 21, 2022

(87) PCT Pub. No.: WO2021/029208
PCT Pub. Date: Feb. 18, 2021

(65) Prior Publication Data
US 2022/0255415 A1 Aug. 11, 2022

(30) Foreign Application Priority Data
Aug. 9, 2019 (JP) .................. 2019-147052

(51) Int. Cl.
*H02M 1/00* (2007.01)
*H02M 1/42* (2007.01)

(52) U.S. Cl.
CPC ....... *H02M 1/0009* (2021.05); *H02M 1/0025* (2021.05); *H02M 1/0058* (2021.05); *H02M 1/4208* (2013.01)

(58) Field of Classification Search
CPC ............ H02M 1/0025; H02M 1/0009; H02M 1/4208; H02M 1/4233; H02M 1/4225; H02M 1/0058
See application file for complete search history.

(56) References Cited

U.S. PATENT DOCUMENTS

| 8,630,105 | B2 * | 1/2014 | Uno | .................. | H02M 1/36 |
| | | | | | 323/299 |
| 9,209,689 | B2 * | 12/2015 | Stevens | ................ | H02M 3/157 |

(Continued)

FOREIGN PATENT DOCUMENTS

| JP | 2011244583 A | 12/2011 |
| JP | 2014018012 A | 1/2014 |
| JP | 2015035851 A | 2/2015 |

OTHER PUBLICATIONS

International Search Report for International Application No. PCT/JP2020/028679; Date of Mailing, Sep. 24, 2020.

(Continued)

*Primary Examiner* — Gustavo A Rosario-Benitez
(74) *Attorney, Agent, or Firm* — CANTOR COLBURN LLP

(57) ABSTRACT

In a power converter apparatus including a PFC circuit operating in a current-critical mode, a zero point of an inductor current is accurately detected. The control circuit includes a current detector unit including a first detection circuit that detects an inductor current, amplifies a voltage corresponding to the detected current with a gain, and outputs it as a detection voltage and a comparison circuit that compares the detected voltage with a predetermined reference voltage and outputs a comparison result signal. The control circuit calculates the reference voltage for making a delay when detecting the zero value of the inductor current substantially zero, based on the detected input voltage, the detected output voltage, the preset delay time, the induc- (Continued)

tance value of the inductor, the conversion factor in current/voltage converting, the power supply voltage, and the gain, and then, outputs it to the comparison circuit.

5 Claims, 23 Drawing Sheets

(56) References Cited

U.S. PATENT DOCUMENTS

| | | | | |
|---|---|---|---|---|
| 9,929,637 | B2* | 3/2018 | Arisawa | H02M 1/12 |
| 10,630,168 | B1* | 4/2020 | Wang | H02M 1/4208 |
| 2008/0164859 | A1* | 7/2008 | Peng | H02M 3/157 |
| | | | | 323/318 |
| 2013/0194842 | A1* | 8/2013 | Bianco | H02M 3/156 |
| | | | | 363/84 |
| 2014/0160801 | A1* | 6/2014 | Stamm | H02M 3/33515 |
| | | | | 363/21.01 |
| 2019/0222117 | A1* | 7/2019 | Poon | H02M 1/4233 |
| 2019/0319528 | A1* | 10/2019 | Matsuura | H02M 1/083 |
| 2020/0144906 | A1* | 5/2020 | Endo | H02M 3/33507 |
| 2020/0244159 | A1* | 7/2020 | Lu | H02M 1/4266 |

OTHER PUBLICATIONS

PCT Written Opinion of the International Searching Authority for International Application No. PCT/JP2020/028679; Date of Mailing, Sep. 24, 2020.

Huang et al., "Predictive ZVS Control With Improved ZVS Time Margin and Limited Variable Frequency Range or a 99% Efficient, 130-W/in3 MHz GaN Totem-Pole PFC Rectifier," IEEE Transactions of Power Electronics, vol. 34, No. 7, Jul. 2019; pp. 7079-7091.

EPO Extended European Search Report for corresponding EP Application No. 20852941.2; Dated, Jul. 4, 2023.

Marxgut et al., "Ultraflat Interleaved Triangular Current Mode (TCM) Single-Phase PFC Rectifier"; IEEE Transactions Onpower Electronics, Institute of Electrical Andelectronics Engineers, USA, vol. 29, No. 2, Feb. 1, 2014(Feb. 1, 2014), pp. 873-882, XP011524648, ISSN: 0885-8993, DOI:10.1109/TPEL.2013.2258941 [retrieved on Aug. 20, 2013].

Sabi et al., Delay Mitigation in High Frequency Dual Current Programmed Mode Control GaN-Based ZVS Inverter; IEEE 2019 20th Workshop On Control and Modeling for Power Electronics (COMPEL), IEEE, Jun. 17, 2019 (Jun. 17, 2019), pp. 1-7, XP033581315, DOI:10.1109/COMPEL.2019.8769704 [retrieved on Jun. 22, 2019].

Sabi et al., "Noise mitigation and delay compensation in high frequency dual current programmed mode control", 2018 IEEE Applied Power Electronics Conference and Exposition (APEC), IEEE, Mar. 4, 2018 (Mar. 4, 2018), pp. 3095-3101, XP033347677, DOI: 10.1109/APEC.2018.8341542 [retrieved on Apr. 18, 2018].

* cited by examiner

CURRENT DETECTOR UNIT 5

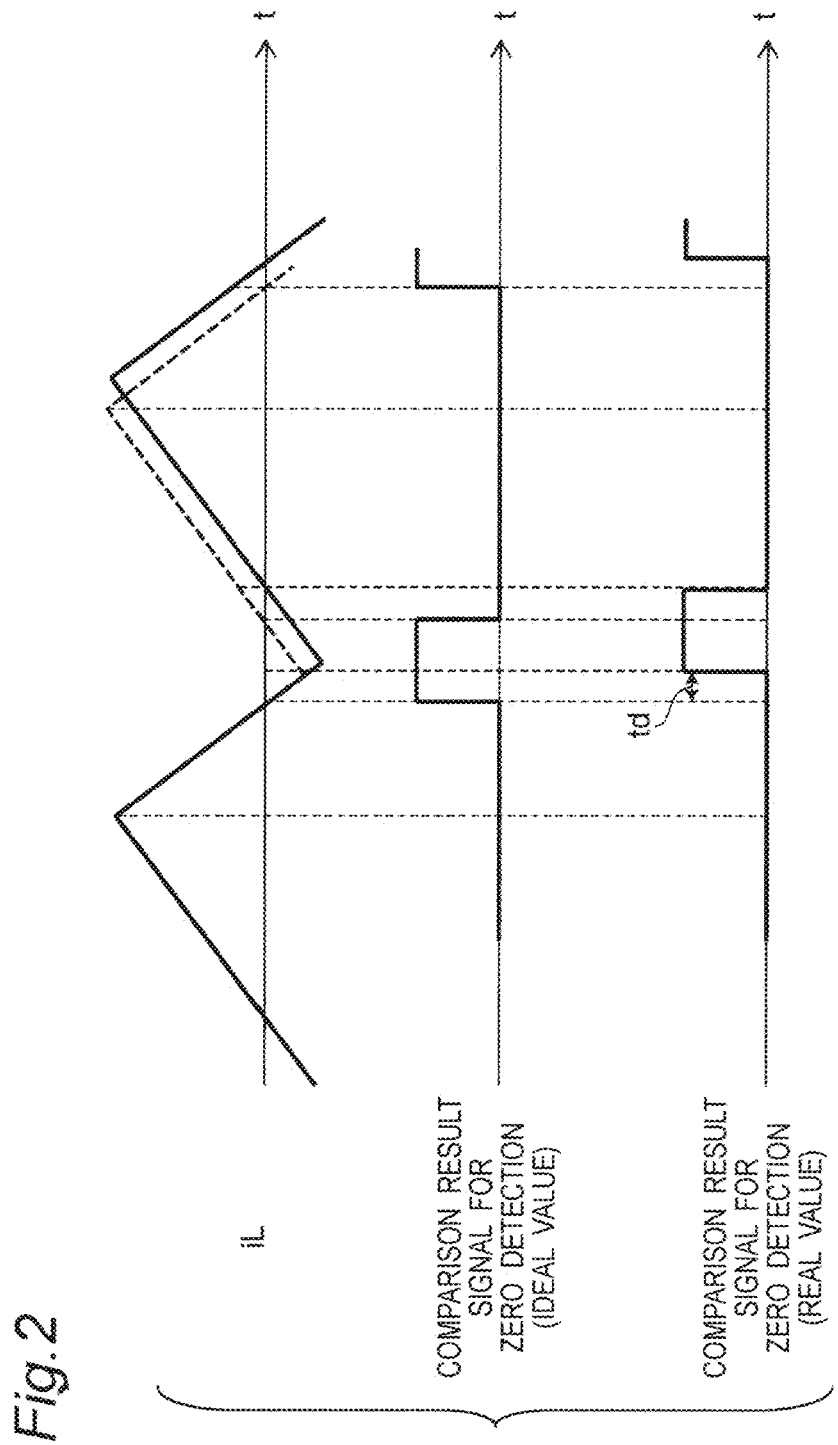

CONTROL CIRCUIT FOR POWER CONVERTER APPARATUS PROVIDED WITH PFC CIRCUIT OPERATING IN CURRENT-CRITICAL MODE

CROSS REFERENCE TO RELATED APPLICATIONS

This is the U.S. national stage of application No. PCT/JP2020/028679, filed on Jul. 27, 2020. Priority under 35 U.S.C. § 119(a) and 35 U.S.C. § 365(b) is claimed from Japanese Application No. 2019-147052, filed Aug. 9, 2019, the disclosure of which is also incorporated herein by reference.

TECHNICAL FIELD

The present invention relates to a control circuit for a power converter apparatus such as a power factor correction circuit, and the power converter apparatus.

BACKGROUND ART

For example, in a power factor correction circuit (hereinafter, referred to as a PFC circuit) that is configured to operate in a current-critical mode, it is necessary to turn on a switching element after the inductor current reaches zero. Thus, it is necessary to accurately detect the zero point of the inductor current (see, for example, Non-Patent Document 1).

PRIOR ART DOCUMENTS

Non-Patent Documents

[Non-Patent Document 1] Qingyun Huang et al., "Predictive ZVS Control with Improved ZVS Time Margin and Limited Variable Frequency Range for A 99% Efficient, 130 W/in3 MHz GaN Totem-Pole PFC Rectifier," IEEE Transactions on Power Electronics, Vol. 34, No. 7, 2018

SUMMARY OF THE INVENTION

Problems to be Solved by the Invention

Conventionally, in a detector circuit for detecting the inductor current, current detection is done with the use of a shunt resistor, an operational amplifier, and a comparator (see, for example, Non-Patent Document 1). Thus, there has been such a problem that the delay of the IC or the delay of a filter for noise removal makes it impossible to detect the zero accurately.

FIG. 2 is a timing chart for describing the delay in the zero detection of an inductor current iL in a current detector circuit according to a conventional example. FIG. 2 illustrates an ideal value and an actual value of a comparison result signal for zero detection. The td of FIG. 2 represents the delay time of the zero detection due to the delay caused by the operational amplifier and the noise filter. More specifically, due to the delay of the comparator IC and the time constant of the noise filter, the comparator starts up with a delay from the current zero detection point at the ideal value, and the negative current thus increases as shown in FIG. 2.

FIG. 3A is a circuit diagram of a switching power supply apparatus for describing such a mechanism that the switching power supply apparatus increases in loss due to the delay in the zero detection of the inductor current, and FIG. 3B is a timing chart showing an operation of the switching power supply apparatus of FIG. 3A. Referring to FIG. 3A, the switching power supply apparatus includes an alternating current power supply 1, an inductor 2, switching elements S1 to S4, a smoothing capacitor 3, and a load resistor 4. FIG. 3B shows the inductor current iL, the drain-source voltage Vds of the switching element S2, the drive signal G2 for the switching element S2, and the drive signal G1 for the switching element S1. In this case, T1 represents a period during which soft switching is performed by the negative current of the inductor current iL.

Due to the delay caused by the soft switching, as shown in FIGS. 3C and 3D, the negative current of the inductor current iL flows through the body diode of the switching element S2. The flow of this extra negative current increases the loss of the switching power supply apparatus.

In particular, in the process of developing a small-sized large-capacity power supply, it is necessary to detect high-frequency and large currents, and the solving means therefor has been an issue.

An object of the present invention is to solve the foregoing problems, and provide a control circuit for a power converter apparatus, capable of accurately detecting the zero point of the inductor current as compared with the prior art in the PFC circuit that operates in the current-critical mode, and provide the power converter apparatus.

Means for Solving the Problems

According to one aspect of the present invention, there is provided a control circuit for a power converter apparatus, where the control circuit includes an inductor and including a power factor correction circuit that is configured to operate in a current-critical mode. The control circuit includes first, second and third detector circuit, and a comparison circuit. The first detector circuit detects a current of the inductor, a current corresponding to the current of the inductor, or a current including the current of the inductor, amplifies a voltage corresponding to a detected current with a predetermined gain, and then outputs an amplified voltage as a detected voltage. The comparison circuit compares the detected voltage with a predetermined reference voltage, and outputs a comparison result signal. The second detector circuit detects an input voltage of the power converter apparatus, and the third detector circuit that detects an output voltage of the power converter apparatus. The control circuit is configured to calculate a reference voltage for making a delay when detecting a zero value of the current of the inductor substantially zero, based on the detected input voltage, the detected output voltage, a preset delay time, an inductance value of the inductor, a conversion coefficient for converting the current detected by the first detector circuit into a voltage, a power supply voltage, and the gain, and then, to output the reference voltage to the comparison circuit. The comparison circuit includes first and second comparators, first and second pulse generator circuits, and a set reset-type flip-flop. The first comparator compares the detected voltage with a predetermined first reference voltage and outputs a first comparison result signal at a zero-cross detection point where the detected voltage changes from a positive value to a negative value. The second comparator compares the detected voltage with a predetermined second reference voltage that is lower than the first reference voltage, and outputs a second comparison result signal at a zero-cross detection point where the detected voltage changes from a negative value to a positive value. The first pulse generator circuit that detects rising of the first comparison result signal, and outputs a first pulse signal, and the second pulse generator circuit that detects rising of the second comparison result signal, and outputs a second pulse signal. The set reset-type flip-flop includes a set terminal, a reset terminal, and an output terminal, the set reset-type flip-flop. The set reset-type flip-flop inputs the first pulse signal to the set terminal, inputs the second pulse signal to the reset terminal, and outputs a comparison result signal of the comparison circuit from the output terminal.

Effect of the Invention

Accordingly, according to the present invention, in the PFC circuit that operates in the current-critical mode, the delay in detecting the inductor current can be prevented to detect the zero point of the inductor current accurately as compared with the prior art. This accurate detection reduces the loss of the power converter apparatus, and leads to the increased density of the power supply apparatus.

BRIEF DESCRIPTION OF THE DRAWINGS

FIG. 2 is a timing chart for describing a delay in the zero detection of an inductor current in a current detector circuit according to a conventional example.

MODE FOR CARRYING OUT THE INVENTION

Figure 1A:
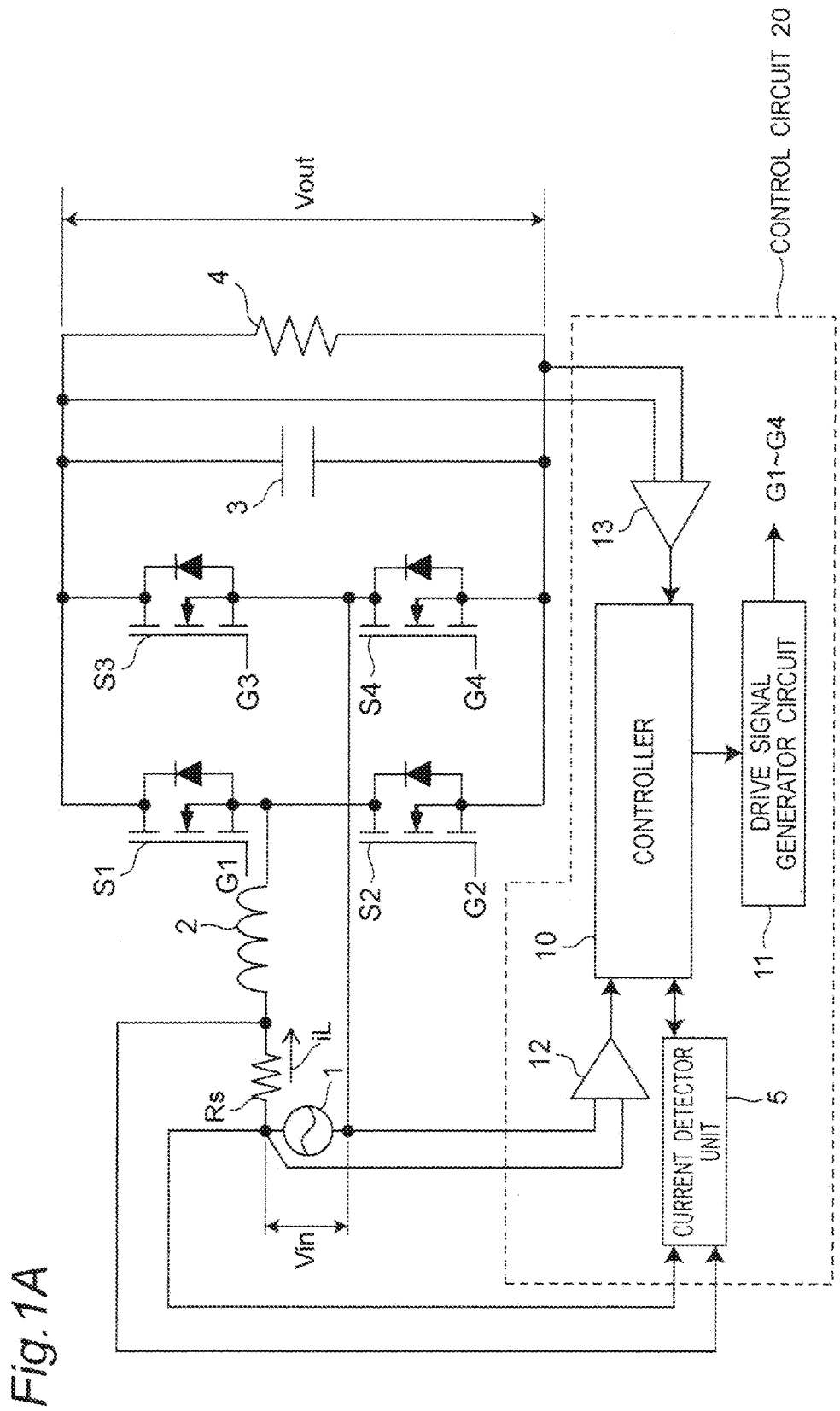
FIG. 1A is a circuit diagram illustrating a configuration example of a switching power supply apparatus including a control circuit 20 according to Embodiment 1.

Hereinafter, embodiments according to the present invention will be described with reference to the drawings. It is to be noted that the same or similar components are denoted by the same reference numerals.

Embodiment 1

FIG. 1A is a circuit diagram illustrating a configuration example of a switching power supply apparatus including a control circuit 20 according to Embodiment 1.

Referring to FIG. 1A, the switching power supply apparatus according to the present embodiment includes an alternating current power supply 1, an inductor 2 that is a reactor, bridge-connected switching elements S1 to S4, a smoothing capacitor 3, a load resistor 4, and a shunt resistor Rs, and a control circuit 20. In this case, the control circuit 20 includes a controller 10, a current detector unit 5, a drive signal generator circuit 11, an input voltage detector circuit 12, and an output voltage detector circuit 13.

The input voltage Vin generated by the alternating current power supply 1 is inputted to the bridge connection circuit of the switching elements S1 to S4 via the shunt resistor Rs and the inductor 2. The respective switching elements S1 to S4 are turned on/off by drive signals G1 to G4 from the drive signal generator circuit 11, and then after the input voltage Vin is switched, the smoothed direct-current voltage is outputted via the smoothing capacitor 3 as an output voltage Vout to the load resistor 4.

The shunt resistor Rs converts an inductor current iL into a voltage value, and then outputs the voltage value to the current detector unit 5. The input voltage detector circuit 12 detects the input voltage Vin, and then outputs the detected input voltage Vin to the controller 10, and the output voltage detector circuit 13 detects the output voltage Vout, and then outputs the detected output voltage Vout to the controller 10. The controller 10 controls the drive signal generator circuit 11 to generate the drive signals G1 to G4, for example, in a current-critical mode, based on each input signal. It is to be noted that the controller 10 includes a DA converter 10a that generates a reference voltage Vref that is predetermined by a method described in detail later.

Figure 1B:
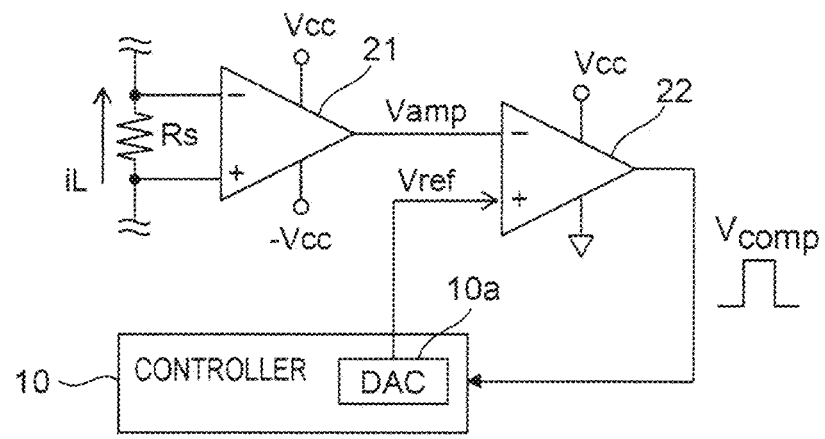
FIG. 1B is a circuit diagram illustrating a configuration example of a current detector unit 5 of FIG. 1A.
Figure 3A:
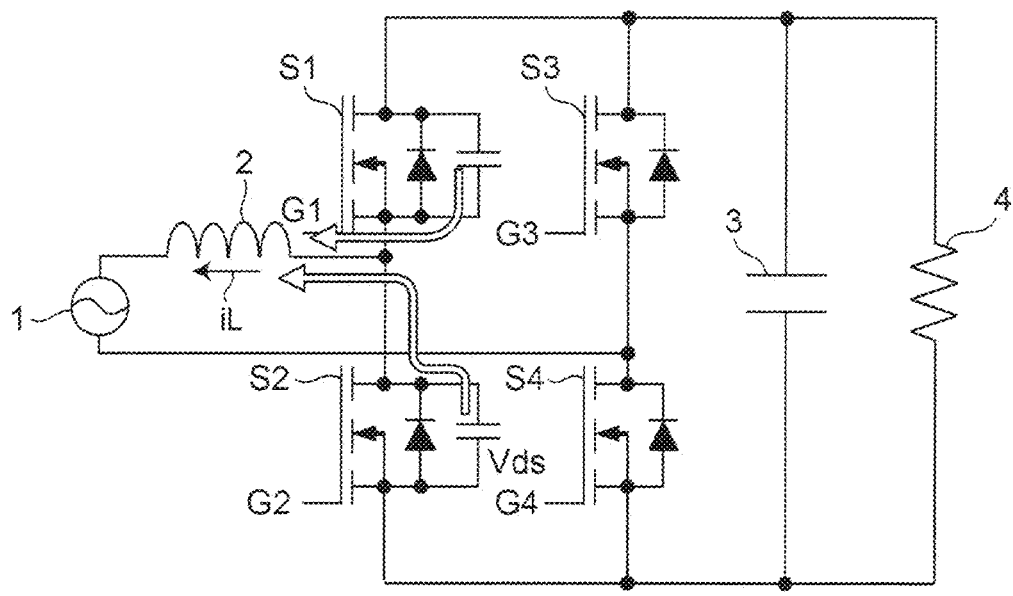
FIG. 3A is a circuit diagram of a switching power supply apparatus for describing such a mechanism that the switching power supply apparatus increases in loss due to the delay in the zero detection of the inductor current.
Figure 3B:
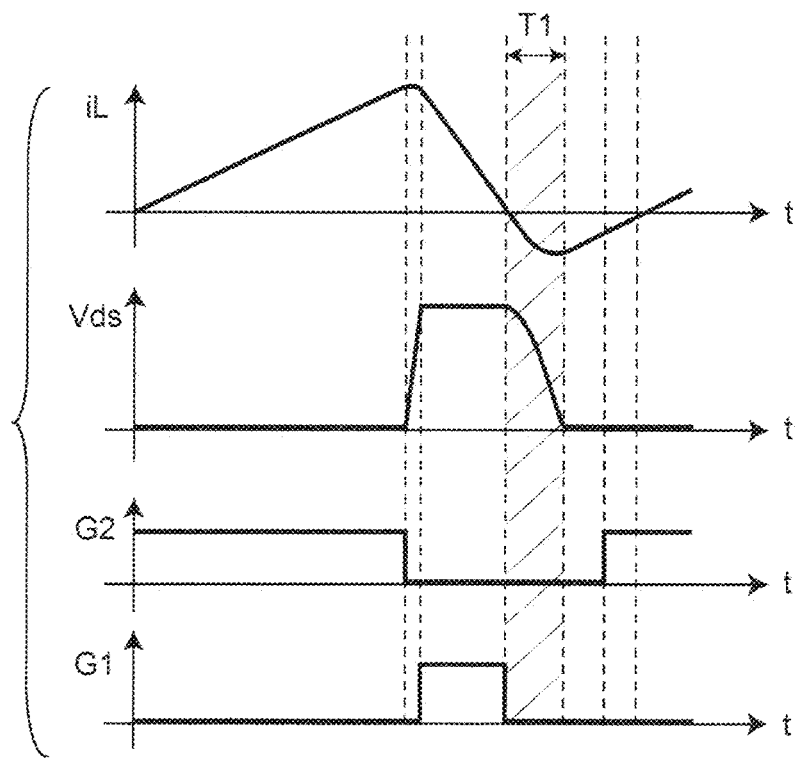
FIG. 3B is a timing chart showing an operation of the switching power supply apparatus of FIG. 3A.
Figure 3C:
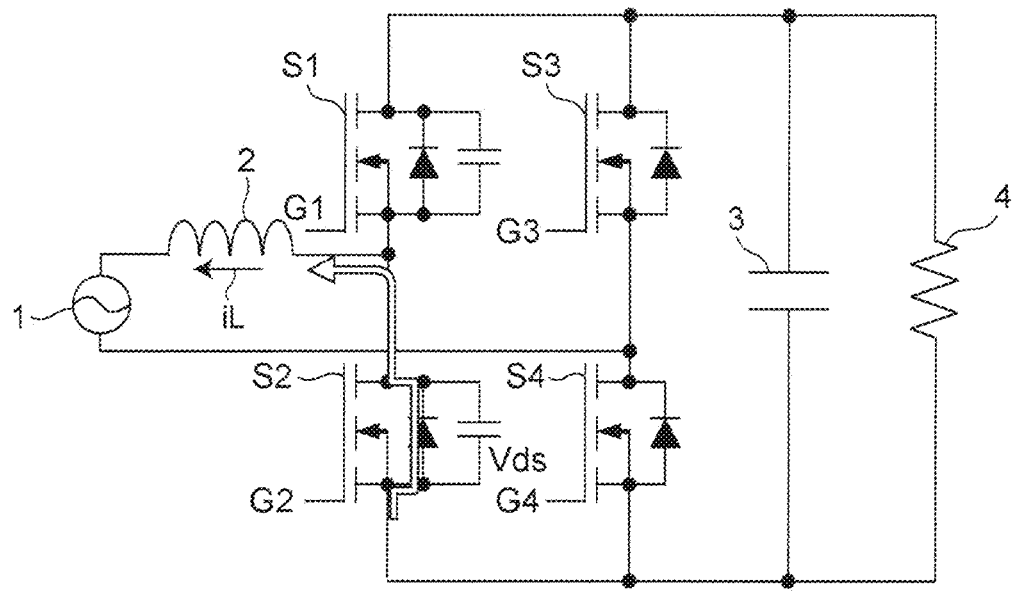
FIG. 3C is a circuit diagram of a switching power supply apparatus for describing a mechanism that the switching power supply apparatus increases in loss due to the delay in the zero detection of the inductor current.
Figure 3D:
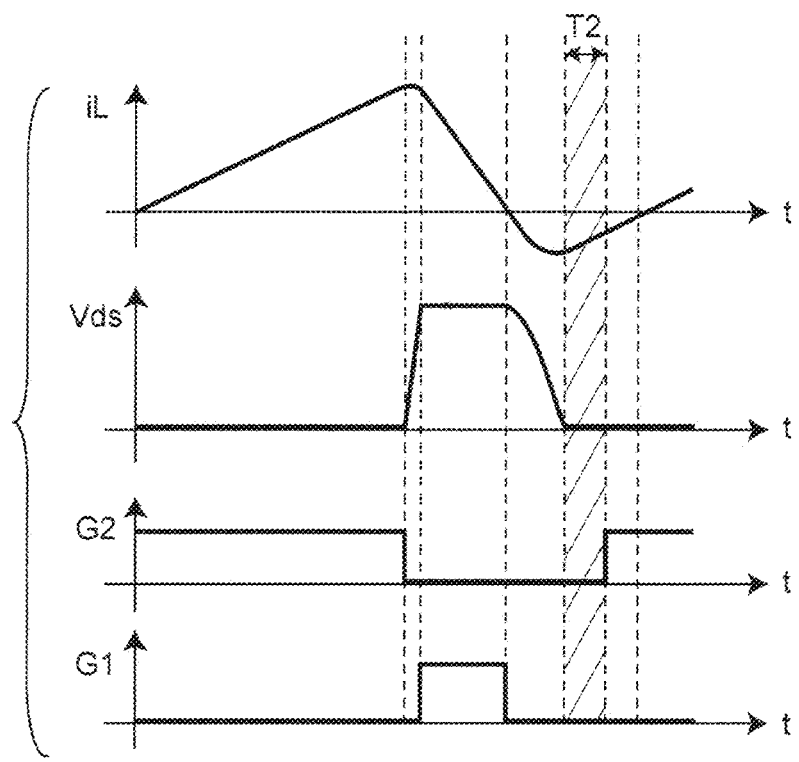
FIG. 3D is a timing chart showing an operation of the switching power supply apparatus of FIG. 3C.

FIG. 1B is a circuit diagram illustrating a configuration example of the current detector unit 5 of FIG. 1A. Referring to FIG. 1B, the current detector unit 5 includes an operational amplifier 21 and a comparator 22. It is to be noted that Vcc denotes a power supply voltage.

The operational amplifier 21 amplifies a voltage corresponding to the inductor current iL detected by the shunt resistor Rs, and outputs the amplified voltage Vamp to the comparator 22. The comparator 22 compares the input amplified voltage Vamp with the reference voltage Vref from the DA converter 10a in the controller 10, then generates a comparison result voltage Vcomp, and outputs the comparison result voltage Vcomp to the controller 10. In response to this output, the controller 10 detects the zero current of the inductor current iL based on the comparison result voltage Vcomp, and performs a switching operation, for example, in the current-critical mode to control the drive signal generator circuit 11 based on this current, to generate drive signals G1 to G4. It is to be noted that the polarity of the reference voltage Vref is inverted in accordance with the input voltage Vin (FIG. 1A) to the PFC circuit, that is, in accordance with the direction of the inductor current iL.

The switching power supply apparatus including the control circuit 20 configured as described above is capable of changing the reference voltage Vref of the comparator 22 in accordance with the delay time to prevent the detection delay. This makes it possible to prevent the efficiency degradation due to the zero-point detection delay of the inductor current iL in the critical-mode PFC circuit. Hereinafter, the action and effect of the present embodiment will be described in detail.

Figure 4A:
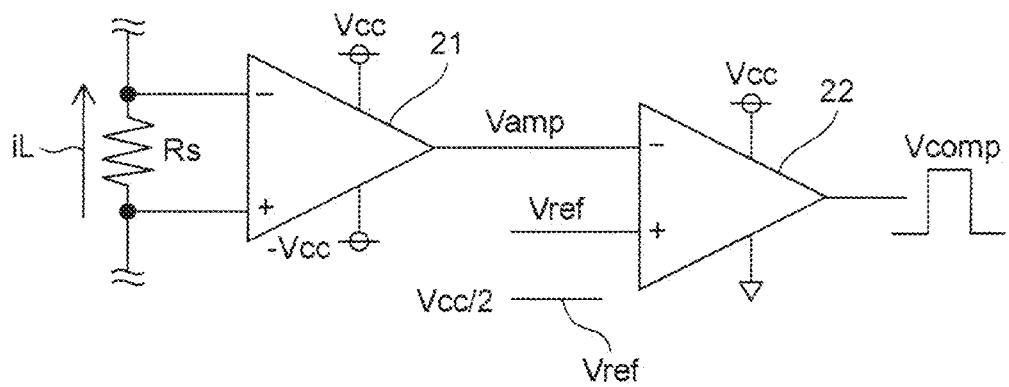
FIG. 4A is a circuit diagram illustrating a configuration example of a current detector unit according to a conventional example.
Figure 4B:
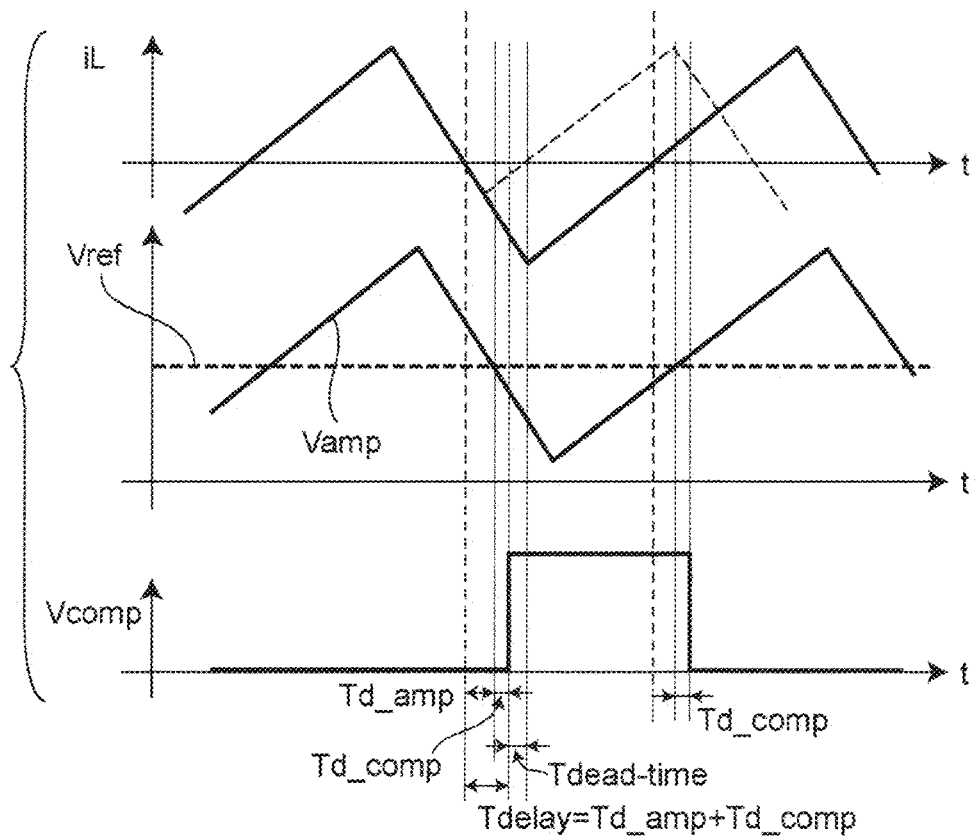
FIG. 4B is a timing chart showing an operation of the current detector unit of FIG. 4A.

FIG. 4A is a circuit diagram illustrating a configuration example of a current detector unit according to the conventional example, and FIG. 4B is a timing chart showing an operation of the current detector unit of FIG. 4A. As shown in FIG. 4A, when the reference voltage Vref of the comparator 22 is a constant voltage such as Vcc/2, a delay time Tdelay is degenerated or caused as shown in FIG. 4B.

Figure 4C:
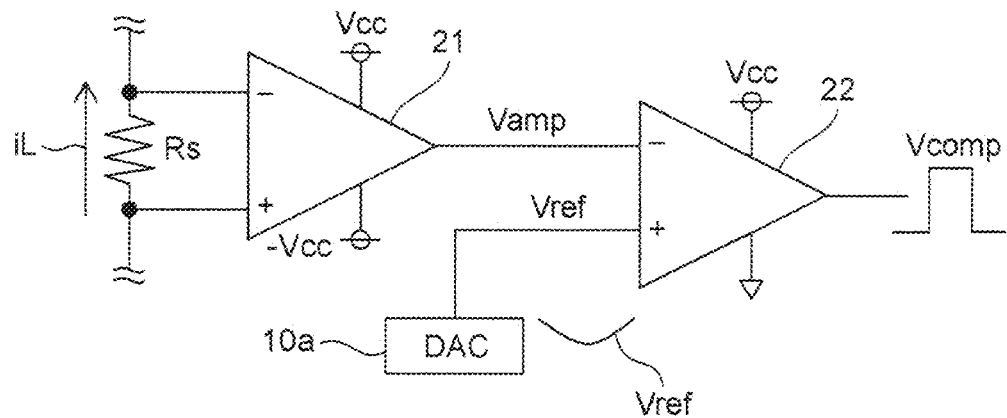
FIG. 4C is a circuit diagram illustrating a configuration example of the current detector unit 5 according to the embodiment.
Figure 4D:
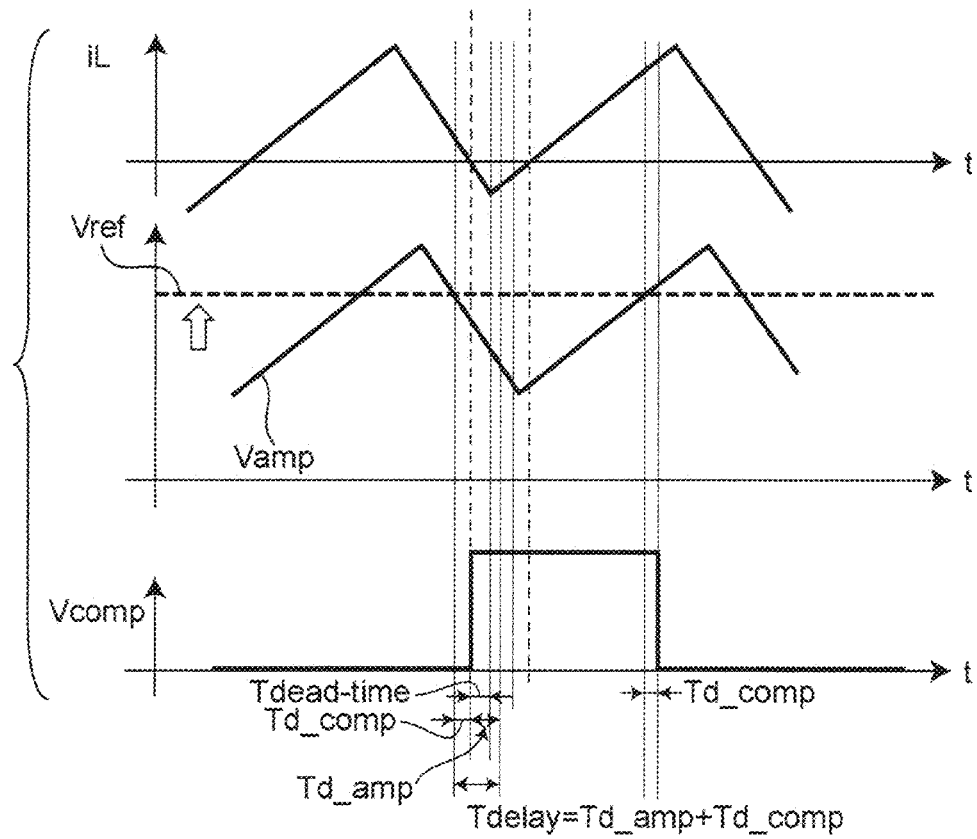
FIG. 4D is a timing chart showing an operation of the current detector unit 5 of FIG. 4C.

FIG. 4C is a circuit diagram illustrating a configuration example of the current detector unit 5 according to Embodiment 1, and FIG. 4D is a timing chart showing an operation of the current detector unit 5 of FIG. 4C. As shown in FIG. 4C, from the DA converter 10a of the controller 10, the reference voltage Vref is increased in accordance with the delay time. More specifically, in the PFC circuit in which the input voltage is an alternating current voltage, the reference voltage Vref can be changed in accordance with the input voltage Vin to reduce the delay time Tdelay by comparison with FIG. 4B, as shown in FIG. 4D. It is to be noted that, in FIG. 4D, (1) Td_amp denotes a delay time due to the amplifying operation of the operational amplifier 21;
(2) Td_comp denotes a delay time due to the comparing operation of the comparator 22; and
(3) Tdead-time denotes a dead time of the switching elements S1 and S2.

Figure 5:
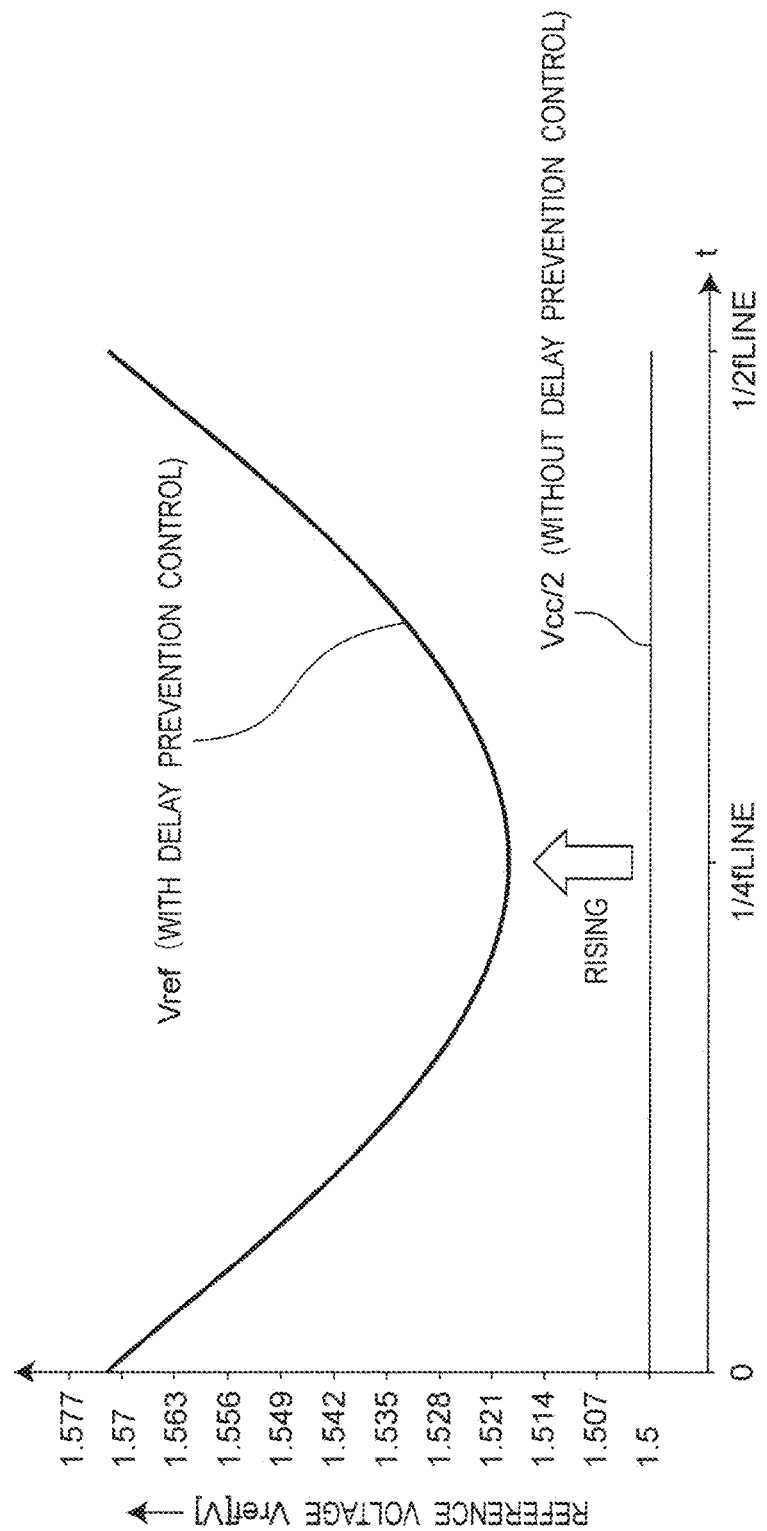
FIG. 5 is a graph showing an operation of the current detector unit 5 according to Embodiment 1.

FIG. 5 is a graph showing an operation of the current detector unit 5 according to Embodiment 1. FIG. 5 illustrates an example of the reference voltage Vref (half the cycle of the input voltage Vin) in the case of, for example, Vcc=3 V, Tdelay=50 ns, Vin(rms)=200 V, and fLINE=50 Hz. With the use of the current detector unit 5 and the controller 10 of FIGS. 1B and 5C, the reference voltage Vref derived from the delay time Tdelay can be fed back and then inputted to the comparator 22 of the current detector unit 5 to reduce the delay time Tdelay.

Hereinafter, an example of a method for deriving the reference voltage Vref will be described below.

Figure 6:
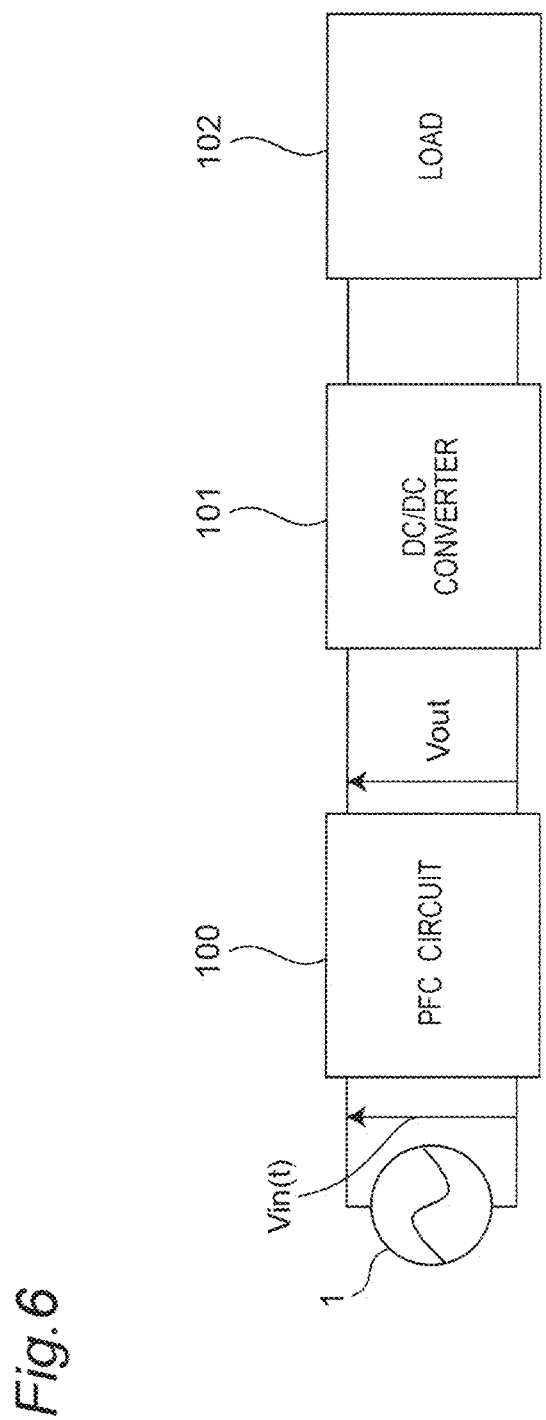
FIG. 6 is a block diagram illustrating a configuration example of a power converter apparatus with a PFC circuit according to Embodiment 1.

FIG. 6 is a block diagram illustrating a configuration example of the power converter apparatus with a PFC circuit according to Embodiment 1. Referring to FIG. 6, the power converter apparatus includes an alternating current power supply 1, a PFC circuit 100, a DC/DC converter 101, and a load 102. The control target is the PFC circuit, which thus has an input alternating current voltage and an output direct-current voltage referred to as Vin(t) and Vout, respectively. The input voltage Vin (t) is expressed by the following equation:

$$Vin(t) = \sqrt{2}\, Vin(rms) \times \sin(2\pi f_{LINE} t). \qquad \text{[Equation 1]}$$

In this case, the input voltage Vin(rms) and the line frequency fLINE are different from each other in accordance with the country or the region, and an example thereof is as follows:

$$Vin(rms) = 100\text{ V},\ 200\text{ V},\ 230\text{ V}$$

$$fLINE = 50\text{ Hz or } 60\text{ Hz}$$

In the case of using the current detector unit 5 of FIGS. 1B and 4C, the resistance value of the shunt resistor Rs is referred to as Rs, the gain of the operational amplifier 21 is referred to as G, and the voltage applied to the operational amplifier 21 and the comparator 22 is set to Vcc.

Figure 7:
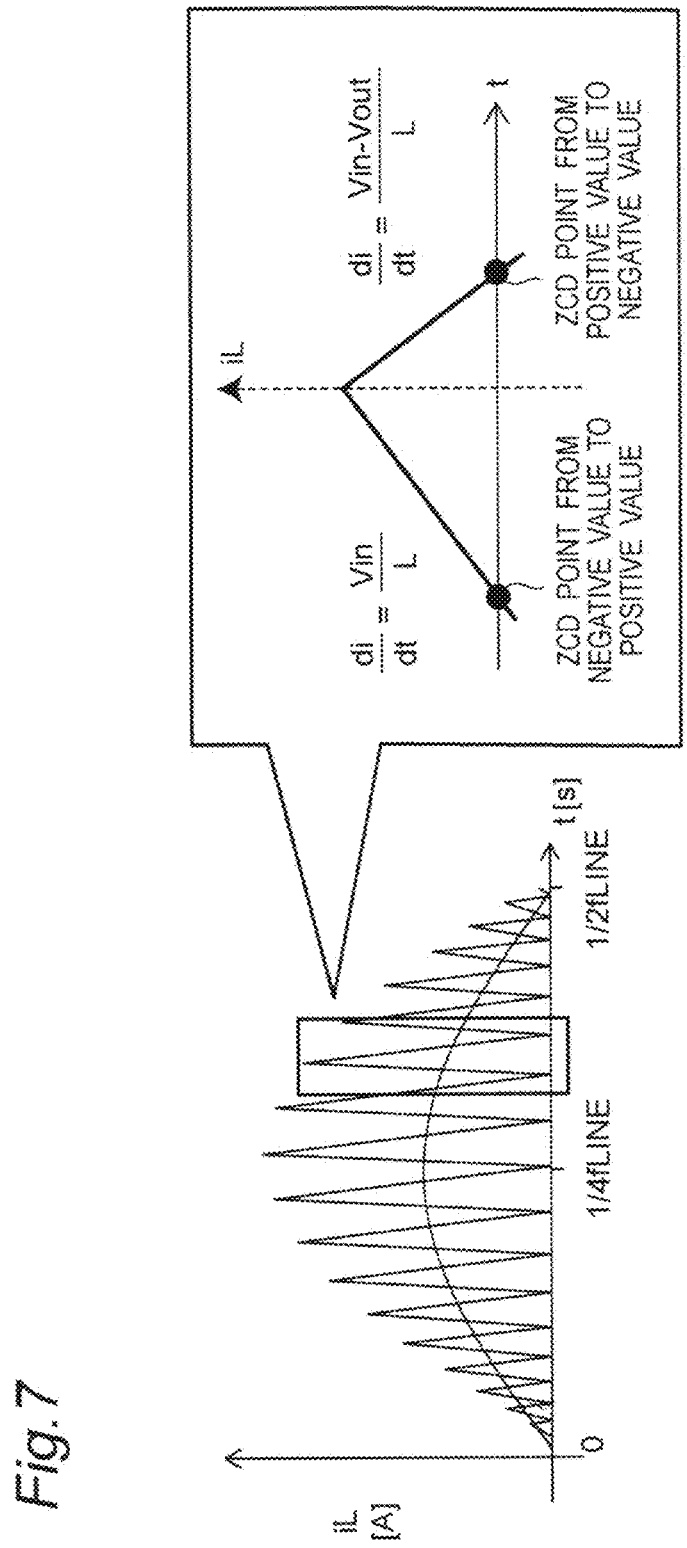
FIG. 7 is a waveform diagram for describing a method for deriving a reference voltage Vref for use in the current detector unit 5 according to Embodiment 1.

FIG. 7 is a waveform diagram for describing a method for deriving the reference voltage Vref for use in the current detector unit 5 according to Embodiment 1.

The inductor current iL in half the cycle of the input voltage Vin is as shown in the graph of FIG. 7, and an enlarged view of pulling out one switching cycle is illustrated on the right side. In this case, the slope of the inductor current iL is determined from vin(t), Vout, and the inductance value L. Based on the detection delay time Tdelay of the zero current, the current variation Δidelay that changes during the delay time is expressed by the following equation:

$$\Delta i_{delay} = \frac{V_{out} - v_{in}(t)}{L} T_{delay}. \qquad \text{[Equation 2]}$$

The zero current has only to be detected early by this current variation $\Delta$idelay. The current variation $\Delta$idelay can be multiplied by the resistance value Rs of the shunt resistor and the gain G of the operational amplifier 21 to achieve conversion into a voltage, and the reference voltage Vref in the consideration of the delay time is thus expressed by the following equation:

$$V_{ref} = \frac{V_{out} - v_{in}(t)}{L} T_{delay} \cdot R_{shunt} \cdot G + \frac{Vcc}{2}. \quad \text{[Equation 3]}$$

Figure 8A:
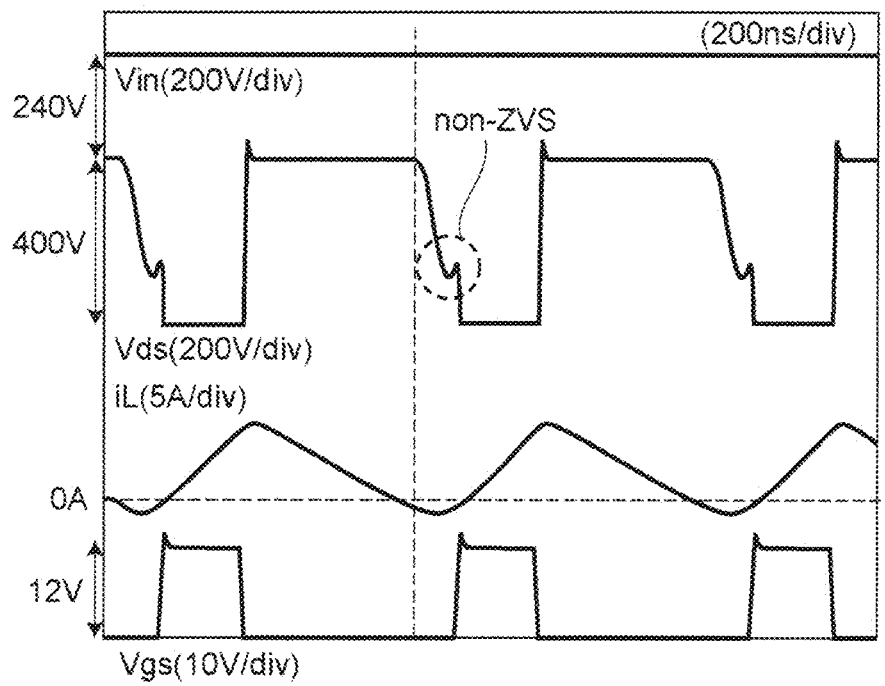
FIG. 8A is a waveform diagram for describing soft switching of a PFC circuit by the current detector unit 5 according to Embodiment 1.
Figure 8B:
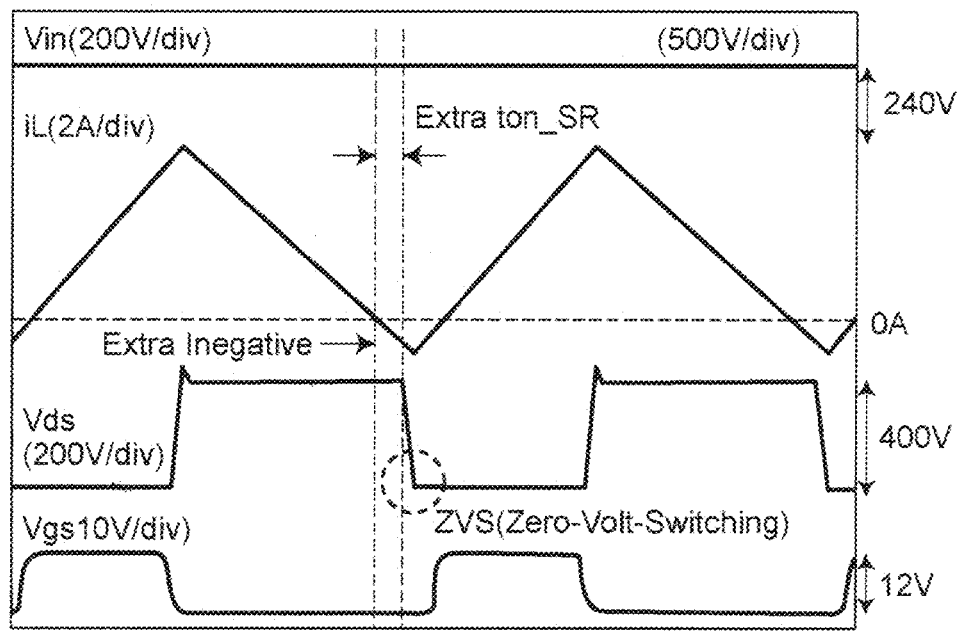
FIG. 8B is a waveform diagram for describing soft switching of the PFC circuit by the current detector unit 5 according to Embodiment 1.

FIGS. 8A and 8B are waveform diagrams for describing soft switching of the PFC circuit by the current detector unit 5 according to Embodiment 1. In this case, FIG. 8A is a waveform diagram with Vin>Vout/2, and FIG. 8B is a waveform diagram in additional ON-time control.

Embodiment 1 is characterized in that TCM control is performed merely by changing the reference voltage Vref of the comparator 22 with the use of a known TCM (Triangular Current Mode) control method. In FIGS. 8A and 8B, the respective reference symbols are as follows:
Vin: input voltage;
Vds: drain-source voltage of the main switch element;
iL: inductor current; and
Vgs: gate-source voltage of the main switch element.

According to Embodiment 1 described above, the controller 10 calculates the reference voltage Vref for making the delay substantially zero when detecting the zero value of the inductor current iL, based on the detected input voltage Vin and output voltage Vout, the preset delay time, the inductance value of the inductor 2, the resistance value of the shunt resistor Rs (in the modified embodiment described later, it is the conversion coefficient in the case of converting the inductor current iL in current detection to a voltage, generally a conversion coefficient), the power supply voltage Vcc, and the gain of the operational amplifier 21, and then outputs the reference voltage Vref to the comparator 22. Thus, in the power converter apparatus including the PFC circuit that operates in the current-critical mode, the delay of detecting the inductor current can be prevented to accurately detect the zero point of the inductor current as compared with the prior art.

Under the condition of Vin>Vout/2 in FIG. 8A, soft switching is not possible due to insufficient negative current for pulling out the electric charge of the switching element. Thus, with the use of the TCM control method, the synchronous rectifier switch element is kept continuously to turn on merely for a predetermined additional time a [ns] from the current zero detection point to flow a negative current for pulling out the electric charge.

The soft switching approach illustrated in FIGS. 8A and 8B continuously keeps turning on the switching elements for +α [ns] and then provides the additional ON-time to flow the negative current required for soft switching. However, as shown below with reference to FIG. 9, the negative current required for soft switching can be also adjusted to flow by changing the reference voltage Vref.

Figure 9:
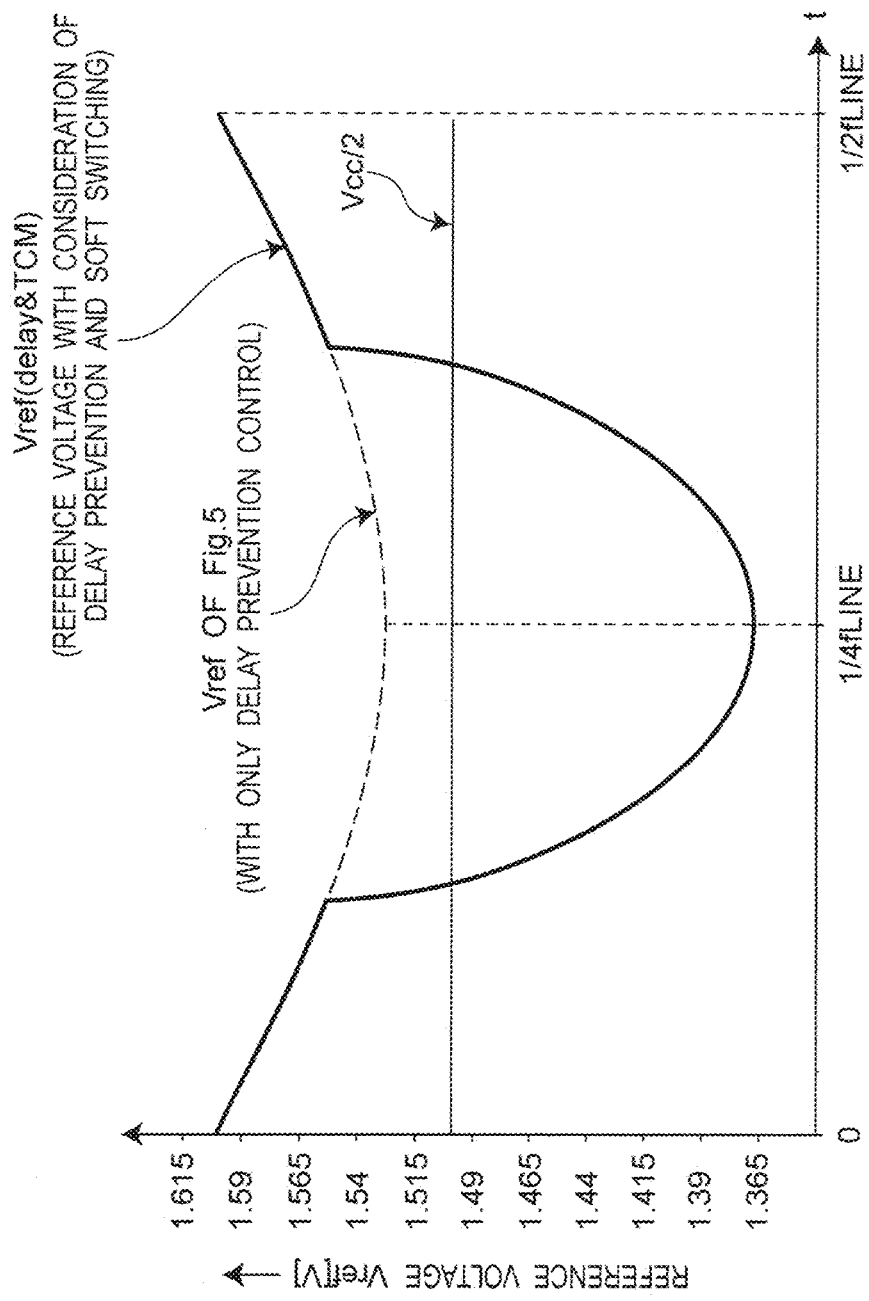
FIG. 9 is a waveform diagram for describing a method for deriving a reference voltage Vref for use in a current detector unit 5 according to a modified embodiment.

FIG. 9 is a waveform diagram for describing a method for deriving the reference voltage Vref for use in the current detector unit 5 according to the modified embodiment. As shown in FIG. 9, the reference voltage Vref only for the delay prevention control of FIG. 5 is decreased only for a predetermined time period, for example, in an elliptical shape. In this case, the negative current required for soft switching can be determined from the input voltage Vin, the output voltage Vout, and the inductance value L of the inductor 2, and can be achieved by addition to the reference voltage Vref in consideration of the delay time.

Figure 10A:
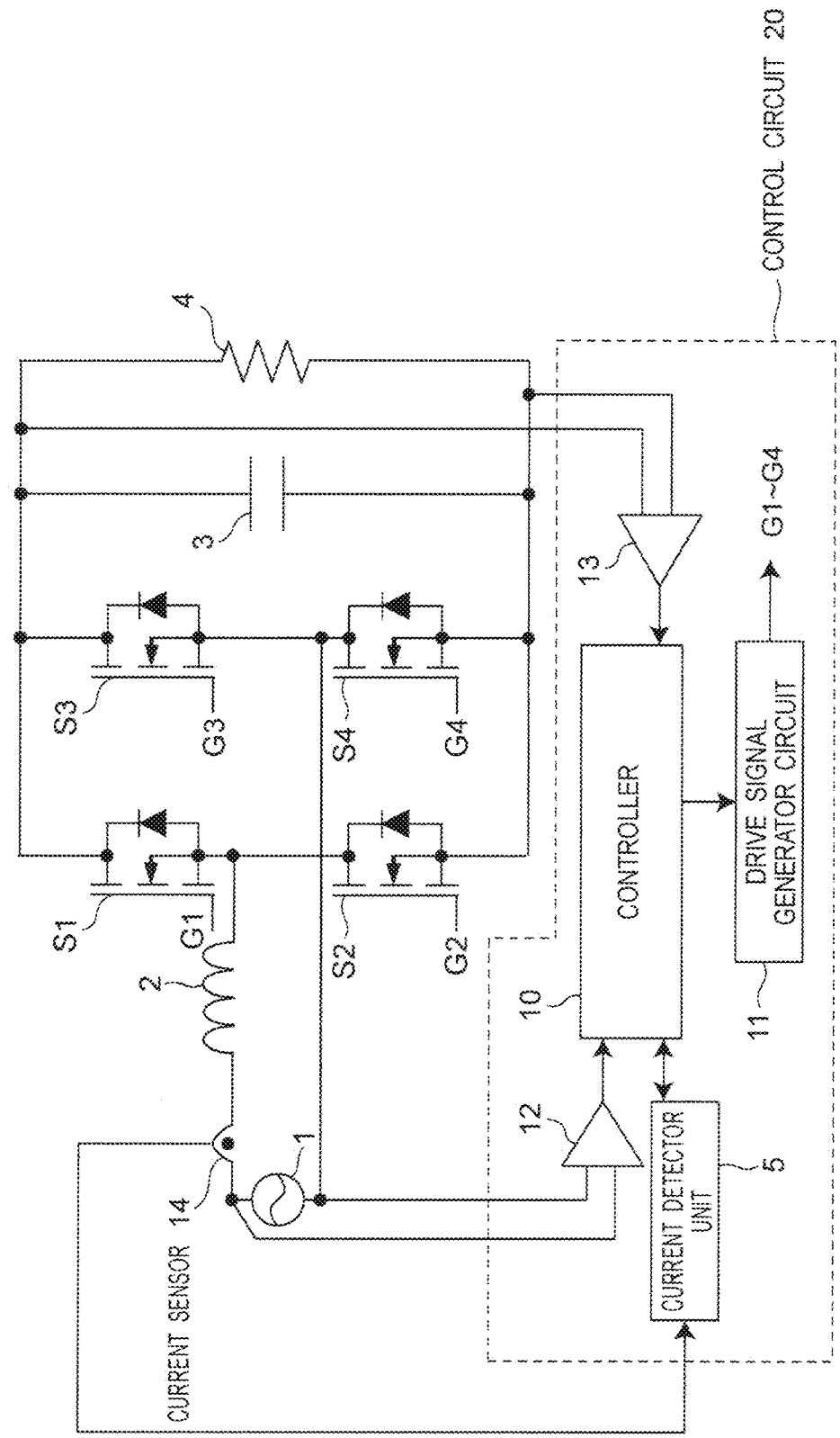
FIG. 10A is a block diagram illustrating a configuration example of a switching power supply apparatus according to Modified Embodiment 1.

FIG. 10A is a block diagram illustrating a configuration example of the switching power supply apparatus according to Modified Embodiment 1. In Embodiment 1 of FIG. 1A, the inductor current iL flowing through the shunt resistor Rs is detected. However, the present invention is not limited to this detection, and as shown in FIG. 10A, for example, the current sensor 14 such as a CT (Current Transformer), a Hall element, and a GMR (Giant Magneto Resistive effect) element may be used to detect the inductor current iL.

Figure 10B:
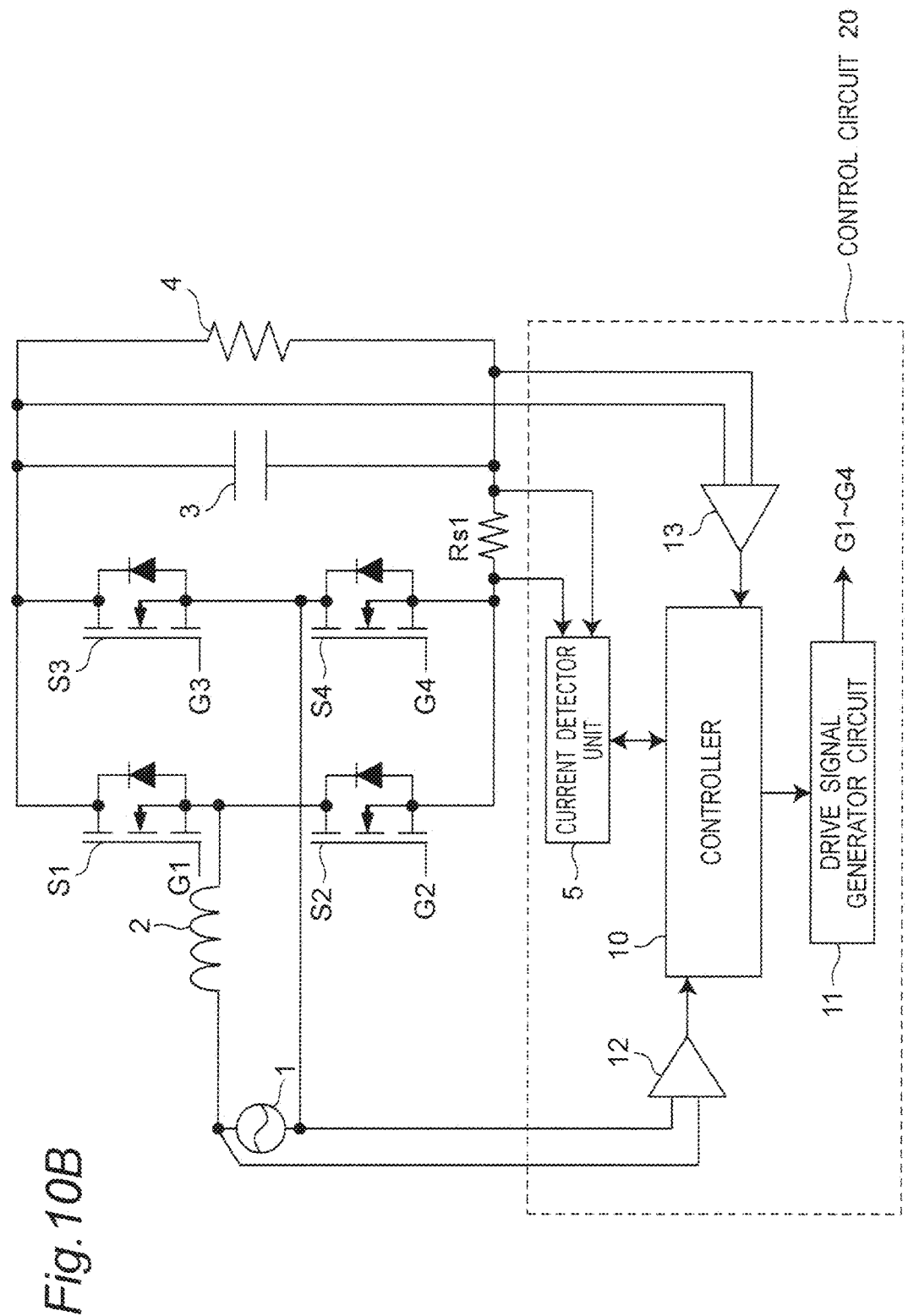
FIG. 10B is a block diagram illustrating a configuration example of a switching power supply apparatus according to Modified Embodiment 2.

FIG. 10B is a block diagram illustrating a configuration example of the switching power supply apparatus according to Modified Embodiment 2. Referring to FIG. 10B, a shunt resistor Rs1 may be inserted between the ground side of switching elements S2 and S4 and the load resistor 4 to detect the zero point of an inductor current iL.

Figure 11A:
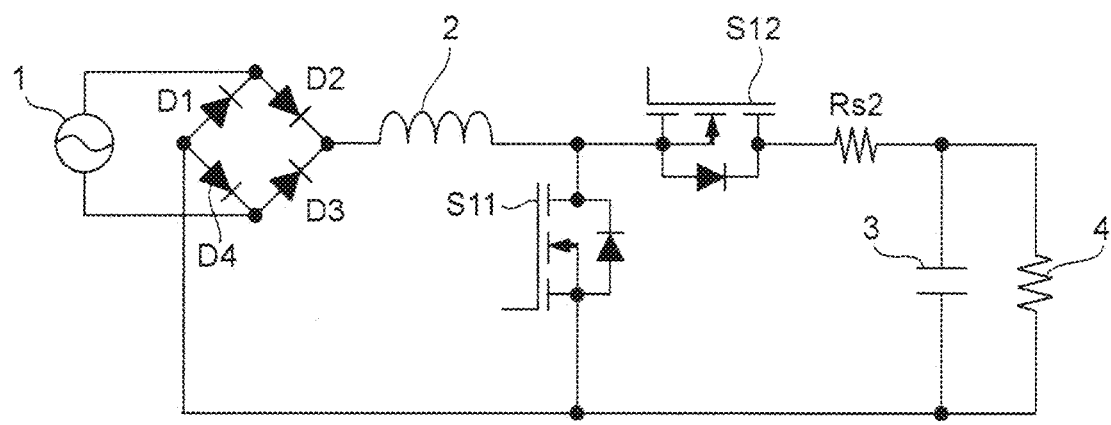
FIG. 11A is a block diagram illustrating a configuration example of a switching power supply apparatus according to Modified Embodiment 3.

FIG. 11A is a block diagram illustrating a configuration example of the switching power supply apparatus according to Modified Embodiment 3. FIG. 11A shows an example of a synchronous rectification-type step-up PFC circuit. Referring to FIG. 11A, the switching power supply apparatus includes the alternating current power supply 1, the four bridge-connected diodes D1 to D4, the inductor 2 that is a reactor, switching elements S11 and S12, a shunt resistor Rs2, and the smoothing capacitor 3, and the load resistor 4. In FIG. 11A, in the case of applying the present embodiment in the synchronous rectification-type step-up PFC circuit, the shunt resistor Rs2 that detects the zero point of the inductor current iL is preferably inserted between the switching element S12 and the smoothing capacitor 3.

Figure 11B:
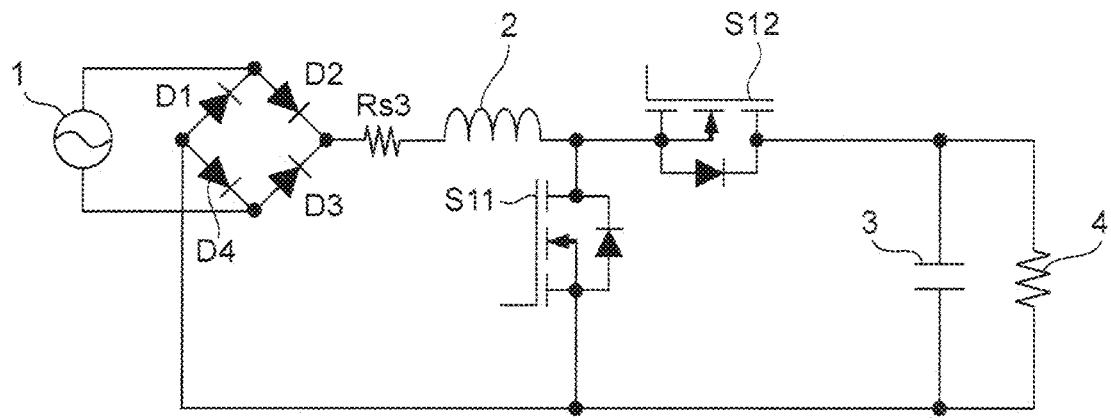
FIG. 11B is a block diagram illustrating a configuration example of a switching power supply apparatus according to Modified Embodiment 4.

FIG. 11B is a block diagram illustrating a configuration example of the switching power supply apparatus according to Modified Embodiment 4. In Modified Embodiment 4 of FIG. 11B, a shunt resistor Rs3 that detects the zero point of the inductor current iL may be inserted between the diodes D1 and D4 and the inductor 2, instead of Modified Embodiment 3 of FIG. 11A.

Modified Embodiments 2 to 4 above are configured to detect a current corresponding to the inductor current iL or a current including the inductor current iL.

Figure 12:
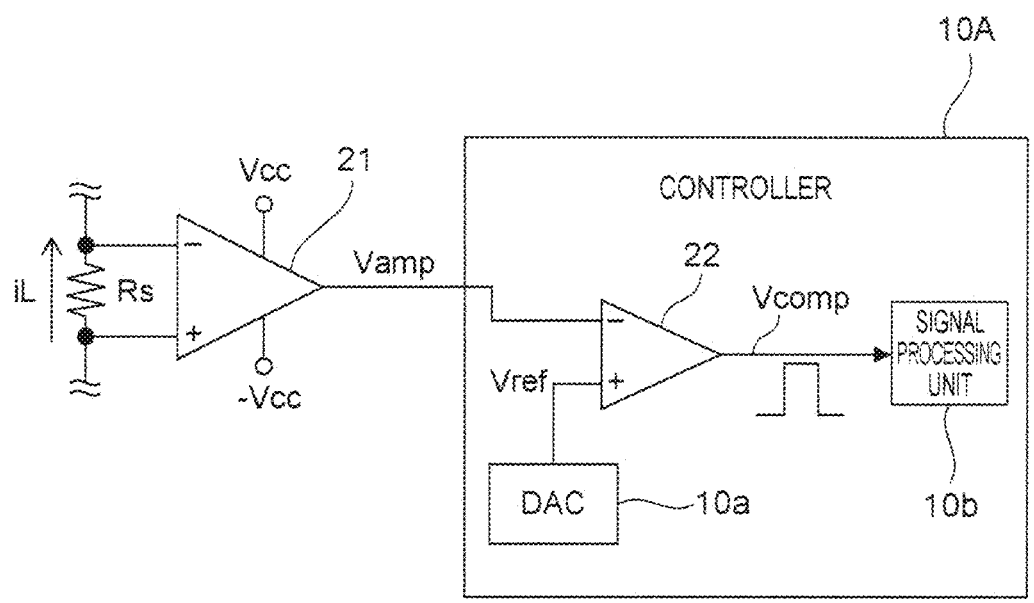
FIG. 12 is a circuit diagram illustrating a modified embodiment of the current detector unit 5 of FIG. 1B.

FIG. 12 is a circuit diagram illustrating a modified embodiment of the current detector unit 5 of FIG. 1B. FIG. 12 is characterized by including, instead of the controller 10, a controller 10A that has a DA converter 10a, the comparator 22, and a signal processing unit 10b. In this case, the signal processing unit 10b performs signal processing for changing the reference voltage Vref described above, based on the comparison result signal Vcomp from the comparator 22.

Some controllers such as DSPs (digital signal processors) have the built-in functions of not only an AD converter and a DA converter, but also a comparator. The use of the built-in comparator 22 has the advantage of eliminating the need for any external comparator IC.

As described above, according to Embodiment 1 and the modified embodiments, in the power converter apparatus including the PFC circuit that operates in the current-critical mode, the delay when detecting the inductor current can be prevented to detect the zero point of the inductor current accurately as compared with the prior art. This accurate detection reduces the loss of the power converter apparatus, and leads to the increased density of the power supply apparatus. In particular, because no magnetic substance is used, any additional part is not required due to no increase in loss even in high-frequency driving. In addition, if the approach of changing the reference voltage Vref is applied, the soft switching function with the voltage resonance can be easily implemented.

Embodiment 2

Figure 13:
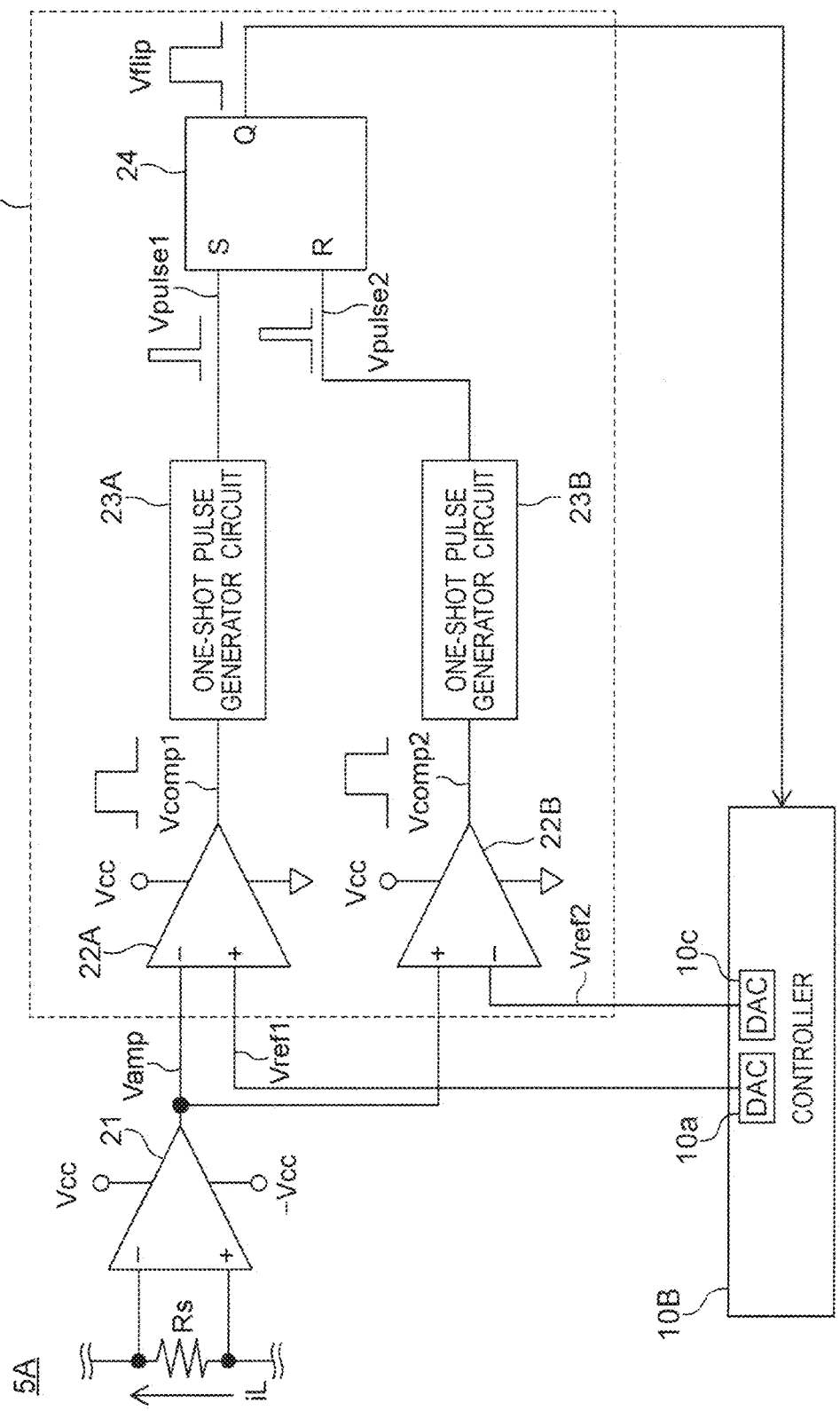
FIG. 13 is a circuit diagram illustrating a configuration example of a current detector unit 5A according to Embodiment 2.

FIG. 13 is a circuit diagram illustrating a configuration example of a current detector unit 5A according to Embodiment 2. Referring to FIG. 13, the current detector unit 5A according to Embodiment 2 has the following differences as compared with the current detector unit 5 in FIG. 1B.

(1) Instead of the comparator 22, a comparison circuit 30 is provided that includes comparators 22A and 22B, a one-shot pulse generator circuit 23A and 23B, and a set reset-type flip-flop 24.

(2) Instead of the controller 10 with the DAC 10a, a controller 10B with the DACs 10a and 10b is provided.

Hereinafter, the above-mentioned differences will be described in detail.

Referring to FIG. 13, the operational amplifier 21 amplifies a voltage corresponding to the inductor current iL detected by the shunt resistor Rs, and outputs the amplified voltage Vamp to the comparators 22A and 22. The controller 10B includes a DA converter 10a that generates a predetermined reference voltage Vref1 described later, and a DA converter 10c that generates a predetermined reference voltage Vref2 described later.

The comparator 22A compares the input amplified voltage Vamp with the reference voltage Vref1 from the DA converter 10a in the controller 10B, then generates a comparison result voltage Vcomp1, and outputs the comparison result voltage Vcomp1 to the one-shot pulse generator circuit 23A. In addition, the comparator 22B compares the input amplified voltage Vamp2 with the reference voltage Vref2 from the DA converter 10c in the controller 10B, then generates a comparison result voltage Vcomp2, and outputs the comparison result voltage Vcomp2 to the one-shot pulse generator circuit 23B. In this case, the voltage settings for the reference voltages Vref1 and Vref2 will be described later with reference to FIG. 14.

The one-shot pulse generator circuits 23A and 23B are configured to include, for example, multiplexer vibrators. Each of the one-shot pulse generator circuit 23A and 23B generates one pulse in response to the rising of the comparison result voltage Vcomp1 or Vcomp2 of the input pulse signal, and outputs the pulse to the set terminal and reset terminal of a set reset-type flip-flop 24. In response to this, the set reset-type flip-flop 24 outputs a zero-cross detection pulse voltage Vflip to the controller 10B. Further, the controller 10B detects the zero current of the inductor current iL based on the zero-cross detection pulse voltage Vflip, and performs a switching operation, for example, in the current-critical mode to control the drive signal generator circuit 11 (FIG. 1A) based on this zero current, to generate drive signals G1 to G4.

Figure 14:
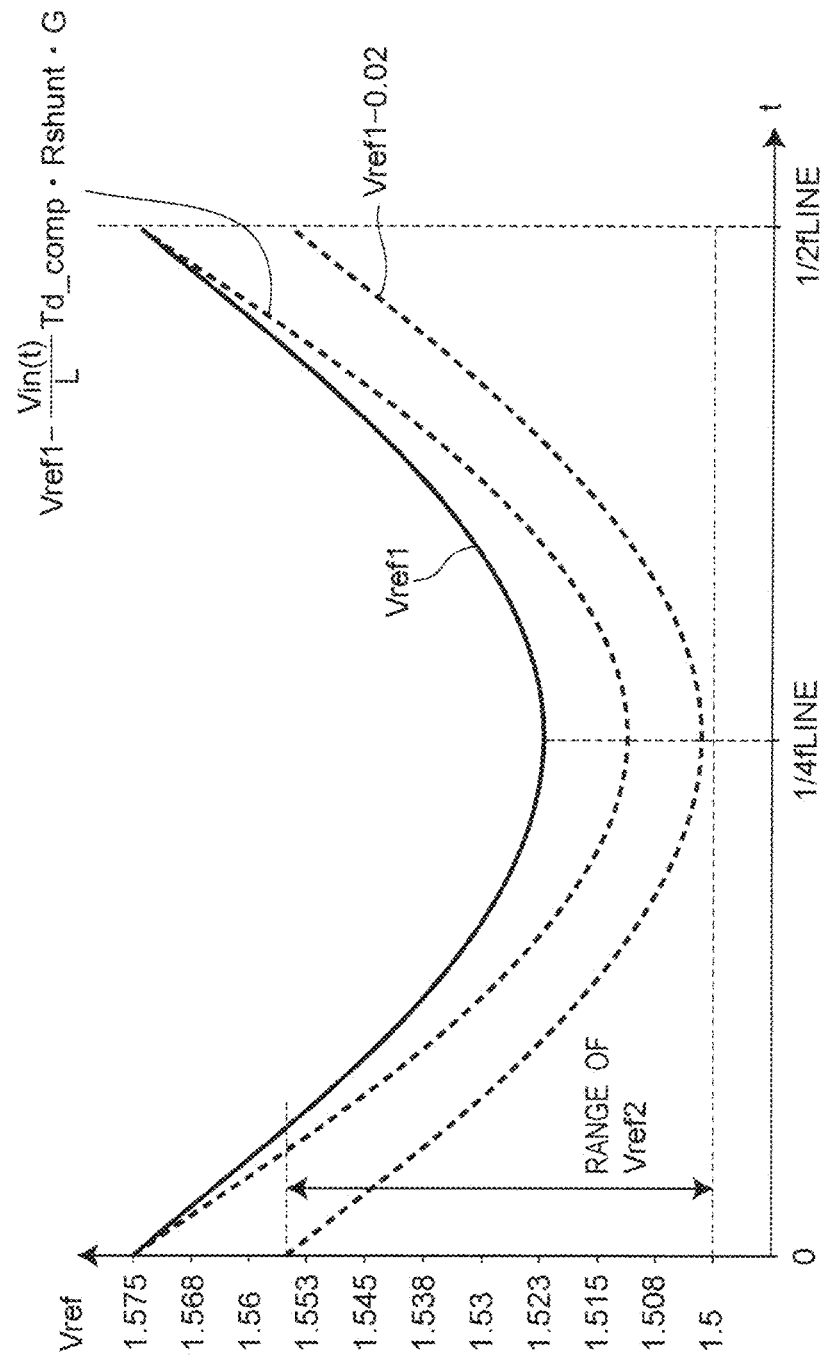
FIG. 14 is a waveform diagram for describing a method for deriving reference voltages Vref1 and Vref2 for use in the current detector unit 5A of FIG. 13.
Figure 15A:
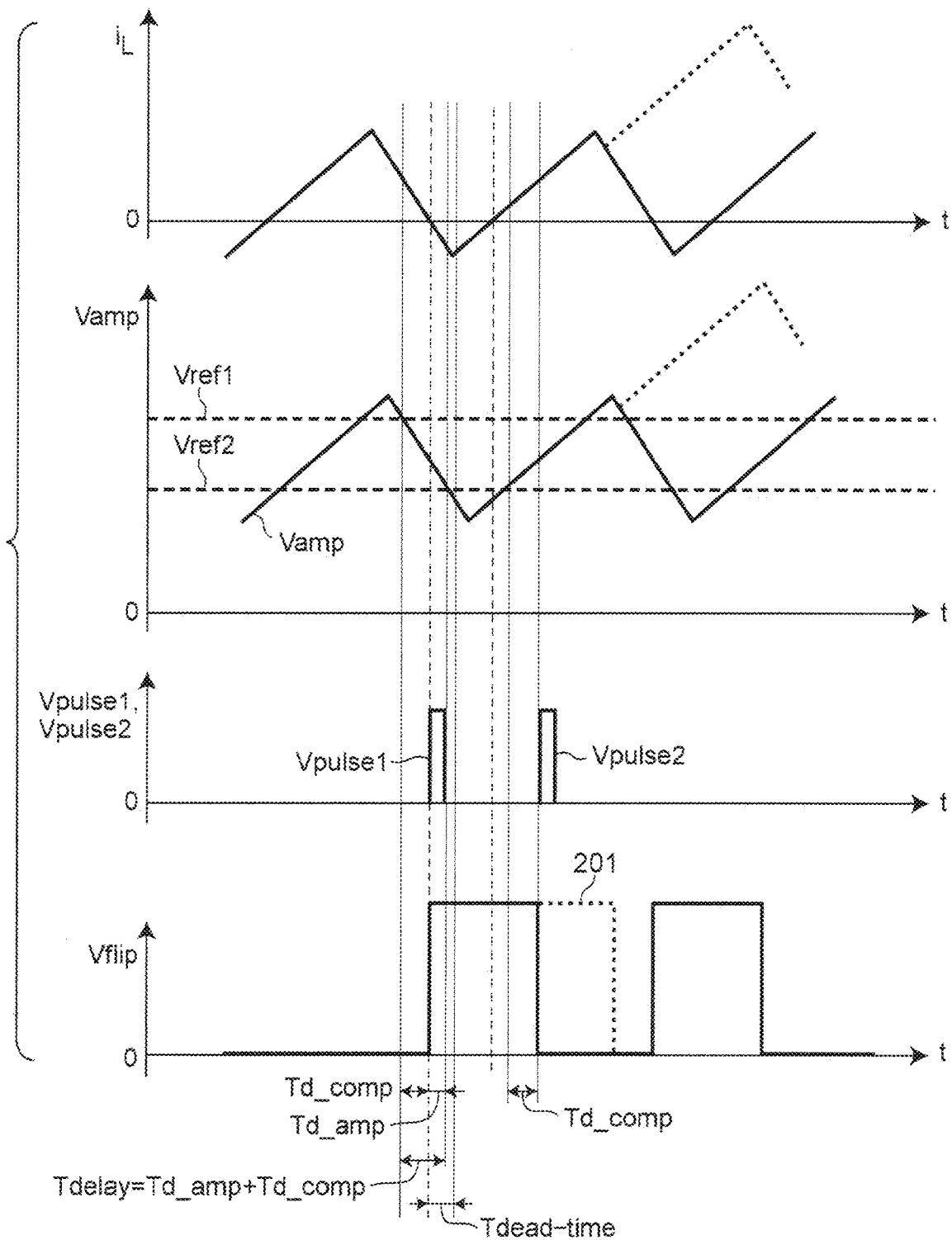
FIG. 15A is a timing chart showing an operation of the current detector unit 5A of FIG. 13.

FIG. 14 is a waveform diagram for describing a method for deriving the reference voltages Vref1 and Vref2 for use in the current detector unit 5A of FIG. 13, and FIG. 15A is a timing chart showing an operation of the current detector unit 5A of FIG. 13.

As shown in FIG. 14, the reference voltage Vref1 is set to the same value as the reference voltage Vref according to Embodiment 1, and set to Vcc/2<Vref1. In this case, the reference voltage Vref1 detects the timing (FIG. 7) of the zero-cross detection point (ZCD point) at which the inductor current iL changes from a positive value to a negative value, and then compensates for the delay in the rising of the zero-cross detection point (ZCD point). In contrast, the reference voltage Vref2, which is set to satisfy Vref2<Vref1, detects the timing (FIG. 7) of the zero-cross detection point (ZCD point) at which the inductor current iL changes from a negative value to a positive value to contribute to reduction in the pulse width of the zero-cross detection pulse voltage Vflip.

More specifically, the comparator 22A of FIG. 13 meets Vref1>Vcc/2 in the case where the input voltage Vin (FIG. 1A) to the PFC circuit has a positive polarity, and the comparator 22A detects the timing at which the inductor current iL changes from a positive value to a negative value, and outputs the comparison result voltage Vcomp1 that indicates the timing. This output eliminates the rising delay of the zero-cross detection pulse voltage Vflip. In addition, the comparator 22B meets Vref2<Vref1 in the case where the input voltage Vin (FIG. 1A) to the PFC circuit has a positive polarity, and detects the timing at which the inductor current iL changes from a negative value to a positive value, and outputs the comparison result voltage Vcomp2 that indicates the timing. This output eliminates the falling delay of the zero-cross detection pulse voltage Vflip. It is to be noted that:

(A) the case where the input voltage Vin (FIG. 1A) to the PFC circuit has a positive polarity is described in this case, and (B) however, in the case of a negative polarity, the reference voltages Vref1 and Vref2 are also inverted in a manner similar to the inversion of the reference voltage Vref described above, and the comparators 22A and 22B operate in a similar manner except for the inversion of these polarities.

In the case of the reference voltage Vref1, it is necessary to accurately detect the "zero-cross detection point" of FIG. 7, and the reference voltage Vref1 is thus derived by the accurate calculation (Embodiment 1). However, the role of the reference voltage Vref2 is the reduction (201 of FIG. 15A) in the pulse width of the zero-cross detection pulse voltage Vflip, and thus, it is not necessary to exactly match the "zero-cross detection point (ZCD point) that changes from a negative value to a positive value" in FIG. 7.

Figure 15B:
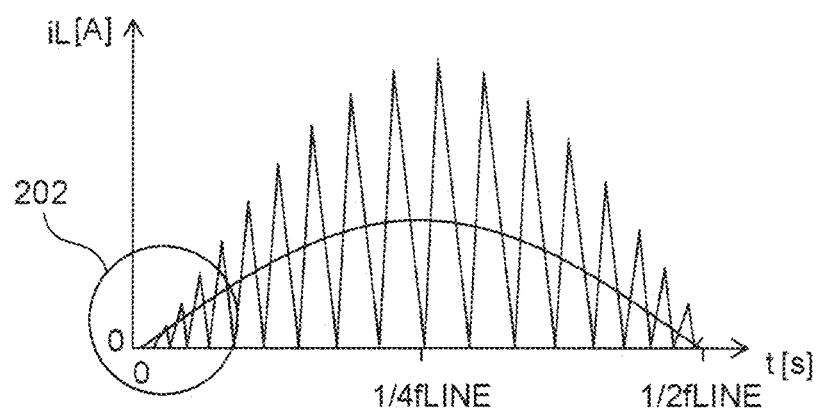
FIG. 15B is a diagram for describing a problem of the current detector unit 5 according to Embodiment 1, which is a waveform diagram showing an inductor current iL.
Figure 15C:
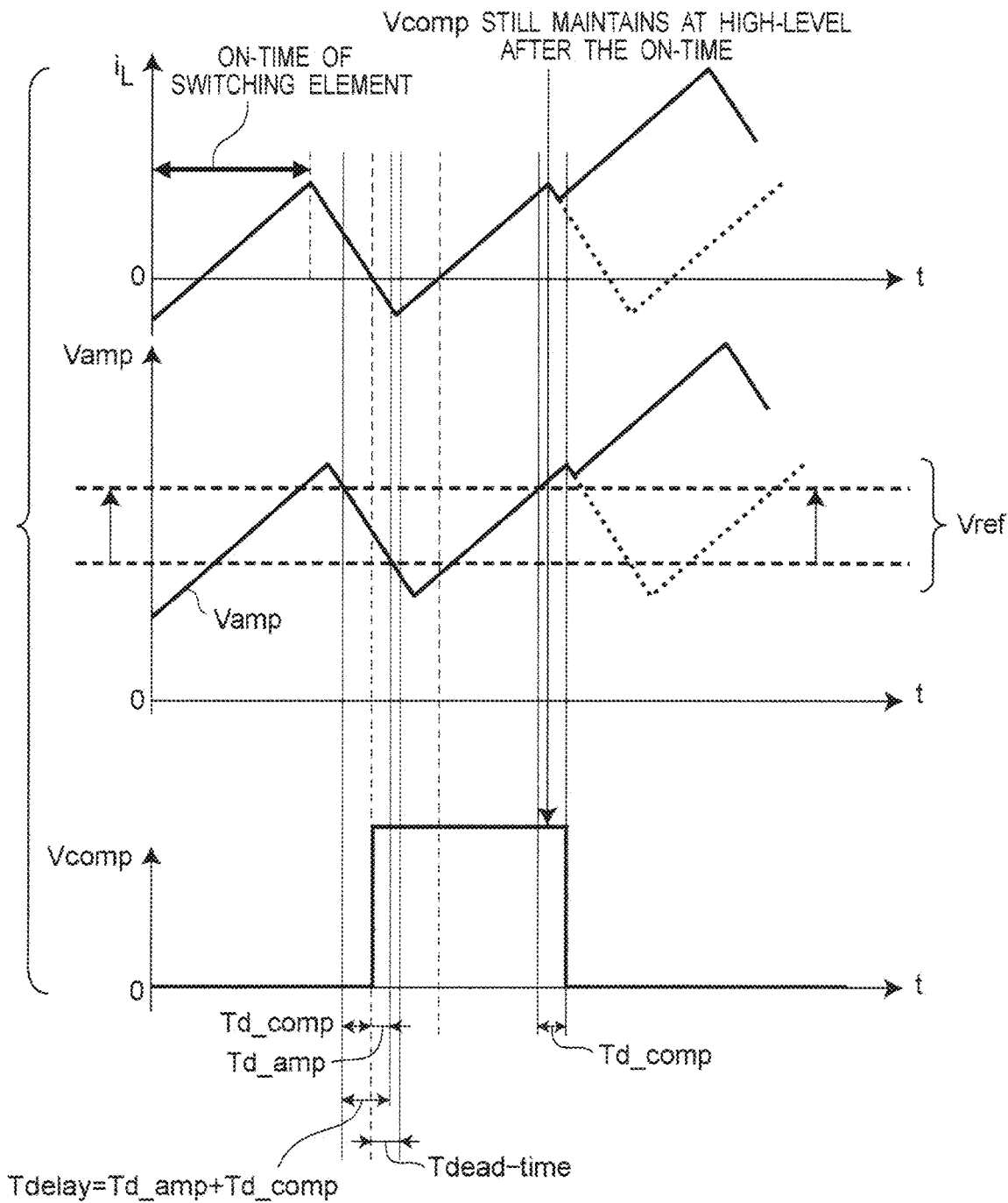
FIG. 15C is a diagram for describing the problem of the current detector unit 5 according to Embodiment 1, which is a timing chart of respective signals and the like corresponding to a part 202 of the waveform diagram of FIG. 15B.

FIGS. 15B and 15C are diagrams for describing the problem of the current detector unit 5 according to Embodiment 1, where FIG. 15B is a waveform diagram showing an inductor current iL, and FIG. 15C is a timing chart of respective signals and the like corresponding to a part 202 of the waveform diagram of FIG. 15B. As is clear from FIG. 5 according to Embodiment 1, the reference voltage Vref near the zero-cross point becomes relatively large. In addition, in the case of high-frequency drive, the inductance value L is relatively small, and thus, the slope of the inductor current iL becomes steep, and the ON-time (which is the time when di/dt is positive) of the switching element becomes short. As a result, as shown in FIG. 15B (the part 202 of the inductor current iL) and FIG. 15C, Embodiment 1 has such a problem as delaying the falling of the comparison result voltage Vcomp and then continuously turning on at the comparison result voltage Vcomp.

As described above, it is not necessary to exactly match the same with the "zero-cross detection point (ZCD point) that changes from a negative value to a positive value" in FIG. 7. However, they should be advanced by the delay times Td_comp of the comparators 22A and 22B as shown in FIGS. 15B and 15C, respectively, and the two ON states can be thus prevented as shown in FIG. 15A if the setting is made so as to satisfy the following equation:

$$V_{ref2} < V_{ref1} - \frac{v_{in}(t)}{L} T_{d\_comp} \cdot R_{shunt} \cdot G. \qquad \text{[Equation 4]}$$

If the above equation and Vref2<Vref1 are satisfied, the reference voltage Vref2 may be set to any value as follows, for example, $$Vref2 = Vcc/2, \text{ or} \quad (1)$$

$$Vref2 = Vref1 - (\text{Constant}) \quad (2)$$

In addition, in the case of the PFC circuit that operates in the current-critical mode (CRM), the inductor current iL hardly flows to the negative side in the case where the input AC voltage is positive, and the reference voltage Vref2 is thus reasonably set in the following range:

$$\frac{Vcc}{2} < V_{ref2} < V_{ref1} - \frac{v_{in}(t)}{L} T_{d\_comp} \cdot R_{shunt} \cdot G. \quad [\text{Equation 5}]$$

As described above, in the present embodiment, the reference voltage Vref2 may be set to satisfy the above equation as shown in FIG. 14.

Figure 16:
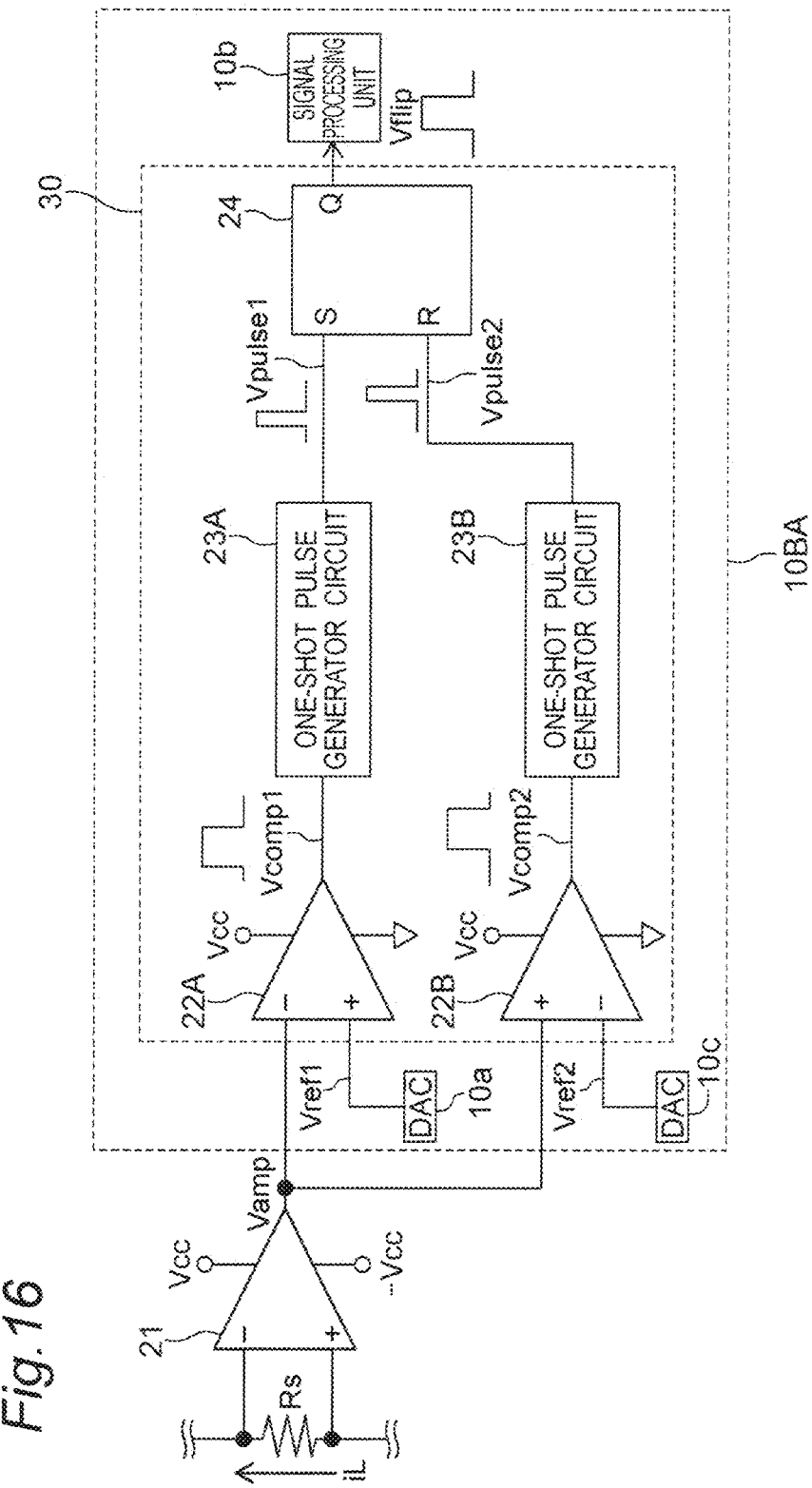
FIG. 16 is a circuit diagram illustrating a modified embodiment of the current detector unit 5A of FIG. 13.

FIG. 16 is a circuit diagram illustrating a modified embodiment of the current detector unit 5A of FIG. 13. FIG. 16 is characterized by including, instead of the controller 10B, a controller 10BA including DA converters 10a and 10b, a comparison circuit 30, and a signal processing unit 10b. In this case, the signal processing unit 10b performs signal processing for changing the above-described reference voltages Vref1 and Vref2, based on the zero-cross detection pulse voltage Vflip from the set reset-type flip-flop 24.

It is to be noted that the current detector unit 5A of FIG. 13 according to Embodiment 2 may be applied in the switching power supply apparatus according to Modified Embodiments 1 to 4 according to Embodiment 1.

As described above, according to Embodiment 2 and Modified Embodiments, in the power converter apparatus including the PFC circuit that operates in the current-critical mode, the delay in detecting the inductor current can be prevented to detect the zero point of the inductor current accurately as compared with the prior art. This accurate detection reduces the loss of the power converter apparatus, and leads to the increased density of the power supply apparatus. In particular, because no magnetic substance is used, any additional part is not required due to no increase in loss even in high-frequency driving. In addition, if the approach of changing the reference voltage Vref is applied, the soft switching function with the voltage resonance can be easily implemented.

Embodiment 3

Figure 17:
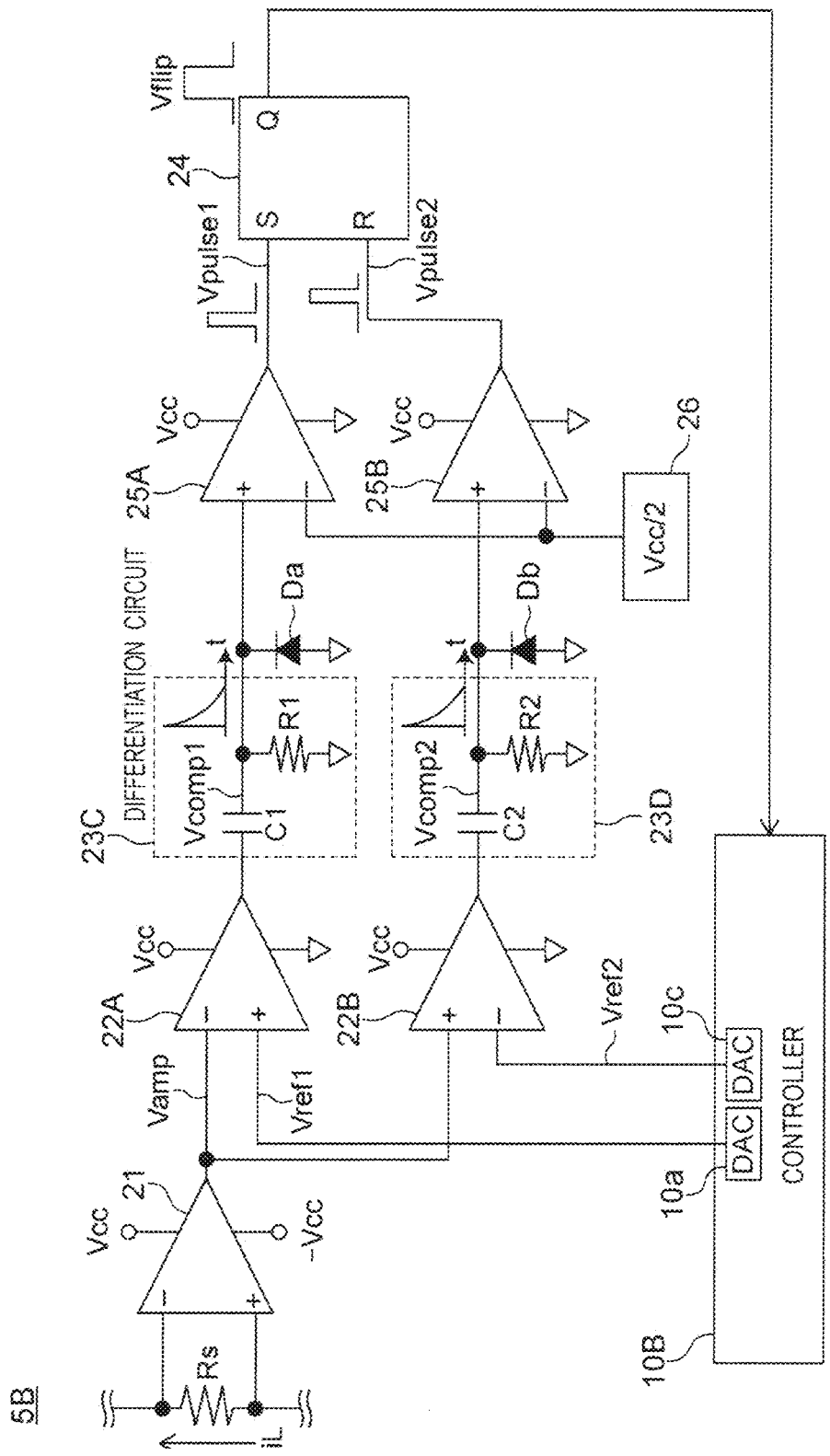
FIG. 17 is a circuit diagram illustrating a configuration example of a current detector unit 5B according to Embodiment 3.

FIG. 17 is a circuit diagram illustrating a configuration example of a current detector unit 5B according to Embodiment 3. Referring to FIG. 17, the current detector unit 5B according to Embodiment 3 has the following differences as compared with the current detector unit 5A according to Embodiment 2.

(1) Instead of the one-shot pulse generator circuit 23A, a differentiation circuit 23C, a circuit of a protection diode Da and a comparator 25A are provided.

(2) Instead of the one-shot pulse generator circuit 23B, a differentiation circuit 23D and, a circuit of a protection diode Db and a comparator 25B are provided.

Hereinafter, the differences will be described.

Referring to FIG. 17, the differentiation circuit 23C includes a capacitor C1 and a resistor R1. The output terminal of the differentiation circuit 23C is provided with the protection diode Da that causes a negative current to flow to the ground, and outputs no negative voltage. The differentiated voltage outputted from the differentiation circuit 23C is inputted via the protection diode Da to the comparator 25A to which a reference voltage Vcc/2 from a reference voltage generator 26 is applied. The comparator 25A compares the input differentiated voltage with the reference voltage Vcc/2, and outputs a comparison result voltage Vpulse1 to a set reset-type flip-flop 24.

The differentiation circuit 23D includes a capacitor C2 and a resistor R2. The output terminal of the differentiation circuit 23D is provided with the protection diode Db that causes a negative current to flow to the ground, and outputs no negative voltage. The differentiated voltage outputted from the differentiation circuit 23D is inputted via the protection diode Db to the comparator 25B to which the reference voltage Vcc/2 from the reference voltage generator 26 is applied. The comparator 25B compares the input differentiated voltage with the reference voltage Vcc/2, and outputs a comparison result voltage Vpulse2 to the set reset-type flip-flop 24.

The current detector unit 5B configured as described above operates in a similar manner to the current detector unit 5A of FIG. 13, except for the above-mentioned differences in the configuration.

It is to be noted that the current detector unit 5B of FIG. 17 according to Embodiment 2 may be applied in the switching power supply apparatus according to Modified Embodiments 1 to 4 according to Embodiment 1. In addition, the current detector unit 5B may be configured like the controller 10BA of FIG. 16

Embodiment 3 and the modified embodiments configured as described above also have the same action and effect as those of the Embodiments 1 and 2.

Application Examples

Although the switching power supply apparatuses are described in the foregoing embodiments or modified embodiments, the present invention is not limited thereto, and can be applied to various power converter apparatuses including the switching power supply apparatuses.

INDUSTRIAL APPLICABILITY

As mentioned above in details, according to the present invention, in the PFC circuit that operates in the current-critical mode, the delay when detecting the inductor current can be prevented to detect the zero point of the inductor current accurately as compared with the prior art. This accurate detection reduces the loss of the power converter apparatus, and leads to the increased density of the power supply apparatus.

The invention claimed is:

1. A control circuit for a power converter apparatus, the control circuit including an inductor and including a power factor correction circuit that is configured to operate in a current-critical mode, the control circuit comprising:
a first detector circuit that detects a current of the inductor,
a current corresponding to the current of the inductor,
or a current including the current of the inductor,
amplifies a voltage corresponding to the detected current with a predetermined gain (G), and then outputs an amplified voltage as a detected voltage;

a comparison circuit that compares the detected voltage with a predetermined reference voltage, and outputs a comparison result signal;
a second detector circuit that detects an input voltage ($v_{in}(t)$) of the power converter apparatus; and
a third detector circuit that detects an output voltage ($V_{out}$) of the power converter apparatus,
wherein the control circuit is configured to calculate the predetermined reference voltage ($V_{ref}$) for making a delay ($T_{delay}$) when detecting a zero value of the current of the inductor substantially zero,
wherein the predetermined reference voltage includes first and second reference voltages ($V_{ref1}$, $V_{ref2}$), and
wherein the comparison circuit comprises:
a first comparator that compares the detected voltage with the first reference voltage ($V_{ref1}$) and outputs a first comparison result signal at a zero-cross detection point where the detected voltage changes from a positive value to a negative value;
a second comparator that compares the detected voltage with the second reference voltage ($V_{ref2}$) that is lower than the first reference voltage ($V_{ref1}$), and outputs a second comparison result signal at a zero-cross detection point where the detected voltage changes from the negative value to the positive value;
a first pulse generator circuit that detects rising of the first comparison result signal, and outputs a first pulse signal;
a second pulse generator circuit that detects rising of the second comparison result signal, and outputs a second pulse signal; and
a set reset-type flip-flop including a set terminal, a reset terminal, and an output terminal, the set reset-type flip-flop inputting the first pulse signal to the set terminal, inputting the second pulse signal to the reset terminal, and outputting the comparison result signal of the comparison circuit from the output terminal,
wherein the control circuit is configured to calculate the predetermined reference voltage ($V_{ref}$) for making the delay when detecting the zero value of the current of the inductor substantially zero, based on the detected input voltage ($v_{in}(t)$), the detected output voltage ($V_{out}$), a preset delay time ($T_{delay}$), an inductance value (L) of the inductor, a conversion coefficient ($R_{shunt}$) for converting the current detected by the first detector circuit into the detected voltage, a power supply voltage (Vcc) which supplied to the first detector circuit and the comparison circuit, and the predetermined gain (G), and then, to output the predetermined reference voltage ($V_{ref}$) to the comparison circuit, by using the following equation:

$$V_{ref} = \frac{V_{out} - v_{in}(t)}{L} T_{delay} \cdot R_{shunt} \cdot G + \frac{V_{CC}}{2},$$

wherein the first pulse generator circuit comprises a first differentiation circuit that differentiates the first comparison result signal, and a first protection diode that is connected to the first differentiation circuit and outputs no negative voltage,
wherein the second pulse generator circuit comprises a second differentiation circuit that differentiates the second comparison result signal, and a second protection diode that is connected to the second differentiation circuit and outputs no negative voltage, wherein the first pulse generator circuit comprises a third comparator that compares a voltage outputted from the first protection diode with half the power supply voltage (Vcc/2), and outputs a comparison result signal as the first pulse signal, and
wherein the second pulse generator circuit comprises a fourth comparator that compares a voltage outputted from the second protection diode with half the power supply voltage, and outputs a comparison result signal as the second pulse signal.

2. The control circuit for the power converter apparatus as claimed in claim 1,
wherein the control circuit is configured to calculate the predetermined reference voltage ($V_{ref}$) in consideration of a negative current required for soft switching of the power converter apparatus.

3. The control circuit for the power converter apparatus as claimed in claim 1,
wherein the control circuit incorporates a DA converter that DA-converts converts a digital reference voltage generated by the control circuit into the predetermined reference voltage ($V_{ref}$).

4. A power converter apparatus comprising a control circuit including an inductor and including a power factor correction circuit that is configured to operate in a current-critical mode, the control circuit comprising:
a first detector circuit that detects a current of the inductor, a current corresponding to the current of the inductor, or a current including the current of the inductor, amplifies a voltage corresponding to the detected current with a predetermined gain (G), and then outputs an amplified voltage as a detected voltage;
a comparison circuit that compares the detected voltage with a predetermined reference voltage, and outputs a comparison result signal;
a second detector circuit that detects an input voltage ($v_{in}(t)$) of the power converter apparatus; and
a third detector circuit that detects an output voltage ($V_{out}$) of the power converter apparatus,
wherein the control circuit is configured to calculate the predetermined reference voltage ($V_{ref}$) for making a delay ($T_{delay}$) when detecting a zero value of the current of the inductor substantially zero,
wherein the predetermined reference voltage includes first and second reference voltages ($V_{ref1}$, $V_{ref2}$), and
wherein the comparison circuit comprises:
a first comparator that compares the detected voltage with the first reference voltage ($V_{ref1}$) and outputs a first comparison result signal at a zero-cross detection point where the detected voltage changes from a positive value to a negative value;
a second comparator that compares the detected voltage with the second reference voltage ($V_{ref2}$) that is lower than the first reference voltage ($V_{ref1}$), and outputs a second comparison result signal at a zero-cross detection point where the detected voltage changes from the negative value to the positive value;
a first pulse generator circuit that detects rising of the first comparison result signal, and outputs a first pulse signal;
a second pulse generator circuit that detects rising of the second comparison result signal, and outputs a second pulse signal; and
a set reset-type flip-flop including a set terminal, a reset terminal, and an output terminal, the set reset-type flip-flop inputting the first pulse signal to the set terminal, inputting the second pulse signal to the reset terminal, and outputting the comparison result signal of the comparison circuit from the output terminal, wherein the control circuit is configured to calculate the predetermined reference voltage ($V_{ref}$) for making the delay when detecting the zero value of the current of the inductor substantially zero, based on the detected input voltage ($v_{in}(t)$), the detected output voltage ($V_{out}$), a preset delay time ($T_{delay}$), an inductance value (L) of the inductor, a conversion coefficient ($R_{shunt}$) for converting the current detected by the first detector circuit into the detected voltage, a power supply voltage (Vcc) which supplied to the first detector circuit and the comparison circuit, and the predetermined gain (G), and then, to output the predetermined reference voltage ($V_{ref}$) to the comparison circuit, by using the following equation:

$$V_{ref} = \frac{V_{out} - v_{in}(t)}{L} T_{delay} \cdot R_{shunt} \cdot G + \frac{V_{CC}}{2},$$

wherein the first pulse generator circuit comprises a first differentiation circuit that differentiates the first comparison result signal, and a first protection diode that is connected to the first differentiation circuit and outputs no negative voltage, wherein the second pulse generator circuit comprises a second differentiation circuit that differentiates the second comparison result signal, and a second protection diode that is connected to the second differentiation circuit and outputs no negative voltage, wherein the first pulse generator circuit comprises a third comparator that compares a voltage outputted from the first protection diode with half the power supply voltage (Vcc/2), and outputs a comparison result signal as the first pulse signal, and wherein the second pulse generator circuit comprises a fourth comparator that compares a voltage outputted from the second protection diode with half the power supply voltage, and outputs a comparison result signal as the second pulse signal.

5. The power converter apparatus as claimed in claim 4, wherein the power converter apparatus is a switching power supply apparatus or a DC/DC convertor apparatus.

* * * * *